US011068634B2

(12) United States Patent
Enenkel et al.

(10) Patent No.: US 11,068,634 B2
(45) Date of Patent: *Jul. 20, 2021

(54) METHOD, COMPUTER PROGRAM AND SYSTEM PROVIDING REAL-TIME POWER GRID HYPOTHESIS TESTING AND CONTINGENCY PLANNING

(71) Applicant: International Business Machines Corporation, Armonk, NY (US)

(72) Inventors: Robert F. Enenkel, Markham (CA); Michael P. Perrone, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/843,365

(22) Filed: Dec. 15, 2017

(65) Prior Publication Data

US 2018/0129768 A1 May 10, 2018

Related U.S. Application Data

(63) Continuation of application No. 13/968,908, filed on Aug. 16, 2013, now abandoned, which is a
(Continued)

(51) Int. Cl.
*G06G 7/54* (2006.01)
*G06F 30/367* (2020.01)
(Continued)

(52) U.S. Cl.
CPC ............ *G06F 30/367* (2020.01); *G06F 30/18* (2020.01); *H02J 3/00* (2013.01); *H02J 13/0006* (2013.01);
(Continued)

(58) Field of Classification Search
CPC ............... G06F 17/509; G06F 17/5036; G06F 2217/78; G06F 30/18; G06F 30/367; H02J 3/00; H02J 13/0006
(Continued)

(56) References Cited

U.S. PATENT DOCUMENTS 7,343,360 B1 * 3/2008 Ristanovic ............. G06Q 30/08
705/412
7,490,013 B2 2/2009 Wei
(Continued)

FOREIGN PATENT DOCUMENTS

EP 1994452 A0 9/2007
WO 2007108834 A2 9/2007

OTHER PUBLICATIONS

Izuegbunam et al. (Power flow and Contingency Assessment Simulation of the expanding 330KV Nigeria Grid Using Power World Simulator, 7 pages). (Year: 2011).*
(Continued)

*Primary Examiner* — Andre Pierre Louis
(74) *Attorney, Agent, or Firm* — Harrington & Smith

(57) ABSTRACT

A data processing system includes a user interface with a user input configured to enable a user to specify a type of simulation to be performed and at least one initial condition, where the simulation is executed using at least one sensor input from a grid structure composed of at least one of a power transmission and distribution grid. The user interface further has a display configured to visualize a representation of a result of a simulation of at least one scenario by presenting a multi-dimensional representation comprised of indicators, where each indicator corresponds to at least one simulation result. The user interface responds to a selection of one of the indicators by the user to visualize a result of the corresponding simulation. The type of simulation can be an
(Continued)

N-k contingency analysis simulation, where k is equal to zero, 1 or greater than 1.

34 Claims, 15 Drawing Sheets

Related U.S. Application Data continuation of application No. 13/956,452, filed on Aug. 1, 2013.

(60) Provisional application No. 61/839,519, filed on Jun. 26, 2013.

(51) Int. Cl.
  *H02J 3/00* (2006.01)
  *H02J 13/00* (2006.01)
  *G06F 30/18* (2020.01)
  G06F 17/10 (2006.01)
  G06F 119/06 (2020.01)

(52) U.S. Cl.
  CPC ....... *G06F 2119/06* (2020.01); *H02J 2203/20* (2020.01); *Y02E 60/00* (2013.01); *Y04S 40/20* (2013.01)

(58) Field of Classification Search
  USPC ................................................. 703/2, 17, 18
  See application file for complete search history.

(56) References Cited

U.S. PATENT DOCUMENTS

| | | |
|---|---|---|
| 8,239,070 B1 | 8/2012 | Schlueter et al. |
| 8,295,989 B2 | 10/2012 | Rettger et al. |
| 8,401,710 B2 | 3/2013 | Budhraja et al. |
| 2007/0239373 A1 | 10/2007 | Nasle |
| 2008/0215302 A1 | 9/2008 | Nasle |
| 2009/0043520 A1 | 2/2009 | Pollack et al. |
| 2009/0281674 A1 | 11/2009 | Taft |
| 2010/0100250 A1 | 4/2010 | Budhraja et al. |
| 2010/0217550 A1 | 8/2010 | Crabtree et al. |
| 2011/0035071 A1 | 2/2011 | Sun et al. |
| 2011/0282508 A1 | 11/2011 | Goutard |
| 2011/0313581 A1 | 12/2011 | Genc et al. |
| 2012/0029897 A1 | 2/2012 | Cherian et al. |
| 2012/0072039 A1 | 3/2012 | Anderson et al. |
| 2012/0173174 A1 | 7/2012 | Gaarder |
| 2012/0179301 A1 | 7/2012 | Aivaliotis et al. |
| 2012/0191439 A1 | 7/2012 | Meagher |
| 2012/0278015 A1 | 11/2012 | Budhraja et al. |

OTHER PUBLICATIONS

Dong et al.; "A platform of power quality real-time simulation based on DDRTS" Journal Ttl: Power System Protection and Control, 37/24 (142-145); 2009; Publisher: Power System Protection and Control Press; Country of Publication: China; ISSN:1674-3415; Database: Ei Compendex(R).

Rudin et al.; "Machine Learning for the New York City power grid" Journal IEEE Transactions on Pattern Analysis and Machine Intelligence, vol. 34, No. 2, pp. 328-345; 2012; Publisher: IEEE; Country of Publication: USA; ISSN: 0162-8828; Database: INSPEC.

Feng et al.; "GridView. Mimicking electricity markets to optimize asset utilization" Journal ABB Review, n 1, p. 26-29; 2003; Publisher: ABB Asea Brown Boveri Ltd. Zurich; Country of Publication: Switzerland; ISSN:1013-3119; Database: CSA Technology Research Database.

Singhania et al.; "What-If IR Drop Analysis: A Method Using SPEF Manipulations" Oct. 13, 2005; Database: ip.com; ip.com No. IPCOM000130144D.

Enenkel et al., "SmartGrid: Analytics for Electric Grid of Future", Abstract for workshop CASCON 2012, pp. 235-236.

Enenkel et al., "Mobile GUI and Supercomputer System for Advanced Real-Time Electric-Grid Reliability and Contigency Planning", IBM Toronto Laboratory, IBM Watson Research Center, CASCON 2012.

Enenkel et al., "Mobile SmartGrid Analytics on Blue Gene/Q: A Prototype for Advanced Electric-Grid Reliability and Real-Time Contingency Planning", Nov. 2012.

IBM Blue Gene/Q, http://www-03.ibm.com/systems/technicalcomputing/solutions/bluegene/index.html; downloaded Apr. 18, 2013.

IBM Smarter Planet Website, http://www.ibm.com/smarterplanet/ca/en; downloaded Apr. 18, 2013.

Feldman, "Top 500 Gets Dressed Up with New Blue", HPCWire. com; downloaded Apr. 18, 2013 (3 pages).

Top500 List—Jun. 2012, http:/www.top500.org/list/2012/06/100.

Zimmerman et al., "MATPOWER: Steady-State Operations, Planning and Anaylsys Tools for Power Systems Research and Education", IEEE Transactions on Power Systems, vol. 26, No. 1, Feb. 2011.

Zimmerman et al., MATPOWER: 4.1 User's Manual, Power Systems Engineering Research Center, Dec. 14, 2011, http://www.pserc.cornell.edu/matpower/manual.pdf.

LaCommare et al., "Understanding the Cost of Power Interruptions to U.S. Electricity Consumers", Ernest Orlando Lawrence Berkeley National Laboratory, LBNL-55718, Sep. 2004.

R. Zimmerman et al., http://www.pserc.cornell.edu/matpower/ A MATLAB Power-System Simulation Pakage, Downloaded Apr. 18, 2013.

Feldman, "Top 500 Gets Dressed up with New Blue", Jun. 19, 2012; http://hpcwire.com.

IBM System Blue Gene/Q Work at the forefront of science with a reliable and efficient platform, IBM Systems and Technology, IBM Corporation, 2011, http://www.ibm.com/systems/deepcomputing/solutions/bluegene.

http://www.ibm.com/extremeblue, downloaded Jul. 17, 2013.

National Power Grid Simulation Capability: Needs and Issues, Dec. 9-10, 2008 Argonne, IL, A report from the National Power Grid Simulator Workshop, U.S. Department of Homeland Security, Science and Technology Directorate.

Apple iPad Website: http://www.apple.com/ca/ipad; Apr. 18, 2013; whole document (2 pages).

"IBM System Blue Gene Solution: Blue Gene/Q Application Development Manual"; http://www.redbooks/ibm.com/redpieces/abstracts/sg247948.html?OPEN; Feb. 11, 2013; whole document (188 pages).

Power World Simulator (Use's Manual, version 13 (2001), 1376 pages)).

Izuegbunam F.I. et al. "Power flow and Contingency Assessment Simulation of the expanding 330K V Nigeria Grid Using Power World Simulator", 2011, 7 pages.

Apple IPad Website, http://www.apple.com/ca/ipad, Apr. 18, 2013.

IBM System Blue Gene Solution. Blue Gene/Q Application Development Manual, http://redbooks.ibm.com/redpieces/abstracts/sg247948.html?Open, Feb. 11, 2013.

Power Systems Test Case Archive, University of Washington Electrical Engineering, http://www.ee.washington.edu/research/pstca, Aug. 1999.

HYPERSIM: Real-time Digital Power System Simulator, Hydro Quebec, http://www.hydroquebec.com/innovation/en/pdf/2010G080-16A-Hypersim.pdf, Mar. 2010.

Gu et al., "Research on Parallel Algorithm for Power Flow Calculation Based on Grid", http://en.cnki.com/cn/Article_en/CJFDTOTAL-ZGDL200903004.htm, Mar. 2009.

\* cited by examiner

FIG. 3

METHOD, COMPUTER PROGRAM AND SYSTEM PROVIDING REAL-TIME POWER GRID HYPOTHESIS TESTING AND CONTINGENCY PLANNING

CLAIM OF PRIORITY FROM PROVISIONAL PATENT APPLICATION

This patent application claims priority under 35 U.S.C. § 119(e) from Provisional Patent Application No. 61/839,519 filed on Jun. 26, 2013, the disclosure of which is incorporated by reference herein in its entirety.

CROSS-REFERENCE TO A RELATED PATENT APPLICATION

This patent application is a continuation of copending U.S. application Ser. No. 13/968,908, entitled "Method, Computer Program And System Providing Real-Time Power Grid Hypothesis Testing And Contingency Planning", filed on Aug. 16, 2013, which is hereby incorporated by reference in its entirety, which itself is a continuation patent application of copending U.S. patent application Ser. No. 13/956,452, filed Aug. 1, 2013, the disclosure of which is incorporated by reference herein in its entirety.

TECHNICAL FIELD

The exemplary embodiments of this invention relate generally to simulation methods and systems and, more specifically, relates to transmission and distribution power grid simulation methods and systems.

BACKGROUND

Electrical power grids, also referred to as transmission grids and distribution grids, are critical components of modern society. Power outages of any duration can lead to significant economic and personal losses. It has become essential for utilities and governments to plan for and to provide a sufficient degree of robustness for growing networks of millions of interconnected electrical power generators and users.

Many electrical power grids have thus far grown organically, without overarching coordination. Electrical utilities are exploring methods to evaluate the sensitivity, reliability, robustness and risk of the grid in real time; however, they currently can only do so in very limited ways.

Due to the growing complexity of electrical power grids and the increasing societal demands for efficiency, resiliency, security and reliability of these power grids, there is a need for an ability to monitor, simulate, predict and react pro-actively to any threats to power grid performance, as well as to model the complex, dynamically changing power grid network in real time, to identify potential problems before they arise and take appropriate action before catastrophic failure occurs.

SUMMARY

In accordance with a first aspect of the embodiments of this invention there is provided a method to simulate operation of a grid structure. The method includes specifying a type of simulation to be performed and at least one initial condition with a user interface of a user device; transmitting the specified type of simulation and the at least one initial condition from the user device to a computing platform; receiving from the computing platform a result of the simulation at the user device, where the simulation is based on at least one of a steady state model of the grid structure and a dynamical model of the grid structure; and visualizing the result of the simulation with the user interface. A visual representation of the result shows a result of the simulation of at least one scenario. Visualizing comprises displaying a multi-dimensional representation comprised of indicators, where each indicator corresponds to at least one simulation result, and further comprises upon a selection of one of the indicators visualizing a result of the simulation of the corresponding simulation result or results.

The method can be performed as a result of execution of computer program instructions stored in a computer-readable medium by a data processor, where the computer-readable medium and the data processor comprise a part of the user device.

In accordance with a further aspect of the embodiments of this invention there is provided a system that includes a computing platform comprising a first interface to receive inputs from sensors that comprise a part of a grid structure comprised of at least one of a power transmission grid and a power distribution grid. The computing platform is configured to execute an electrical power grid simulator program and further comprises a second interface configured to communicate with at least one user device through a communication layer. The system further comprises a user device connected with the computing platform through the communication layer. The user device comprises a graphical user interface, at least one data processor, and at least one non-transitory computer readable medium that stores program instructions. Execution of the stored program instructions enables the user device to specify, in response to input from the graphical user interface, at least one initial condition and a type of simulation to be performed by the electrical power grid simulator program based on the at least one initial condition; to transmit the specified type of simulation and the at least one initial condition from the user device to the computing platform; to receive from the computing platform a result of the simulation at the user device, the simulation being based on at least one of a steady state model of the grid structure and a dynamical model of the grid structure; and to visualize the result of the simulation with the user interface. A visualization comprises a result of the simulation of at least one scenario and displays a multi-dimensional representation comprised of indicators, where each indicator corresponds to at least one simulation result, and where a user selection of one of the indicators initiates visualizing a result of the simulation of the corresponding simulation result or results.

In accordance with another aspect of the embodiments of this invention there is provided a data processing system comprised of at least one data processor and at least one memory medium connected with the at least one data processor. The at least one memory medium stores computer program instructions that are executable by the at least one data processor. The data processing system further comprises a user interface having a user input configured to enable a user to specify a type of simulation to be performed and at least one initial condition, where the simulation is executed by a simulation program using at least in part one or more sensor inputs from a grid structure comprised of at least one of a power transmission grid and a power distribution grid. The user interface further has a display configured to visualize a representation of a result of a simulation of at least one scenario by presenting a multi-dimensional representation comprised of indicators, where each indicator corresponds to at least one simulation result. The user interface is further configured to respond to a selection of one of the indicators by the user to visualize a result of the corresponding simulation.

BRIEF DESCRIPTION OF THE SEVERAL VIEWS OF THE DRAWINGS

FIG. 3 shows an exemplary display at the mobile device shown in FIGS. 1A and 1B of a parameter editing sidebar.

FIG. 11 shows a zoomed-out overview, FIG. 12 shows a zoomed-out power flow visualization, and FIG. 13 shows a zoomed-in view of a portion of the power flow visualization of FIG. 12.

DETAILED DESCRIPTION

The embodiments of this invention provide in one aspect thereof methods, computer programs and a system for electrical power grid simulation and reliability analytics, including remote control and visualization through the use of devices having preferably some type of graphical user interface.

More generally the embodiments of this invention enable simulations of a grid structure to be performed in accordance with one or more scenarios of interest to a user. A scenario could be related to a contingency in an electrical power grid, such as simulating an effect of removing from service one or more grid components. In other non-limiting examples the scenario could be an addition of a new grid component, or the substitution of one grid component for another grid component.

The embodiments of this invention provide in one aspect thereof a graphical user interface (GUI) configured to increase the reliability and efficiency of electrical power grids by enabling improved, real-time contingency planning. In some exemplary and non-limiting embodiments the GUI can be embodied in a mobile device, e.g., in a laptop, or a tablet, or a smart phone, and therefore allows both immediate response to emergency situations and convenient contingency planning, regardless of a user's location. The exemplary embodiments of this invention also provide for the use of the GUI with a high-speed, high-performance backend computing system. In one non-limiting embodiment the backend computing system is configured with a Blue Gene®/Q or similar supercomputer to accelerate physical simulations of the power grid. The resulting enhanced convenience and speed provides that improved power grid reliability and efficiency can be realized by enabling flexible remote collaboration and by enabling the exploration of many more contingencies than are possible with conventional approaches. The improved real-time contingency planning made possible by the use of this invention allows a power grid operator to reduce the frequency, severity and duration of unplanned outages, while also enabling the operator to better optimize system performance, cost and efficiency.

Figure 1A:
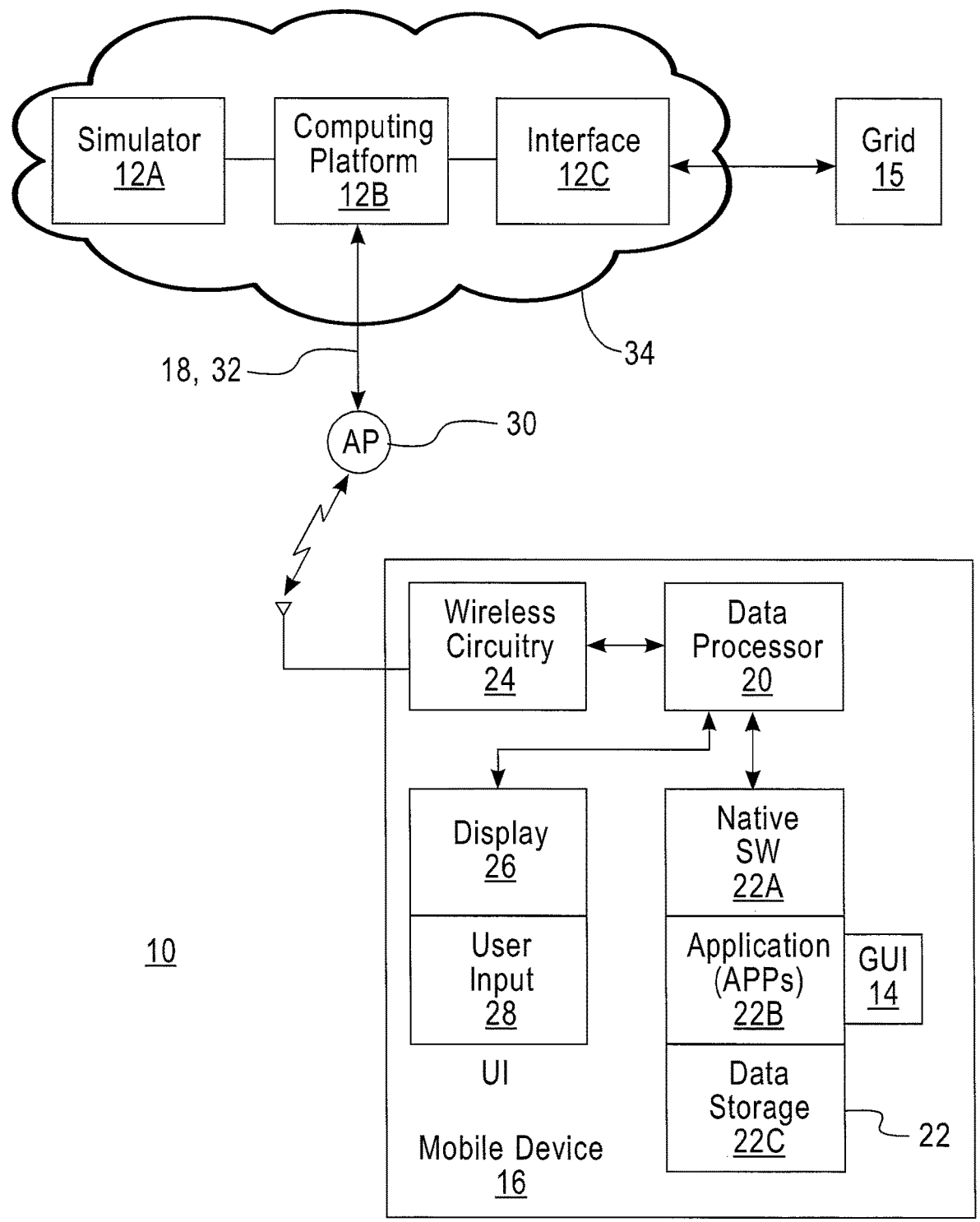
FIG. 1A illustrates a high level block diagram of an example of a system that is configured to implement the embodiments of this invention.
Figure 1B:
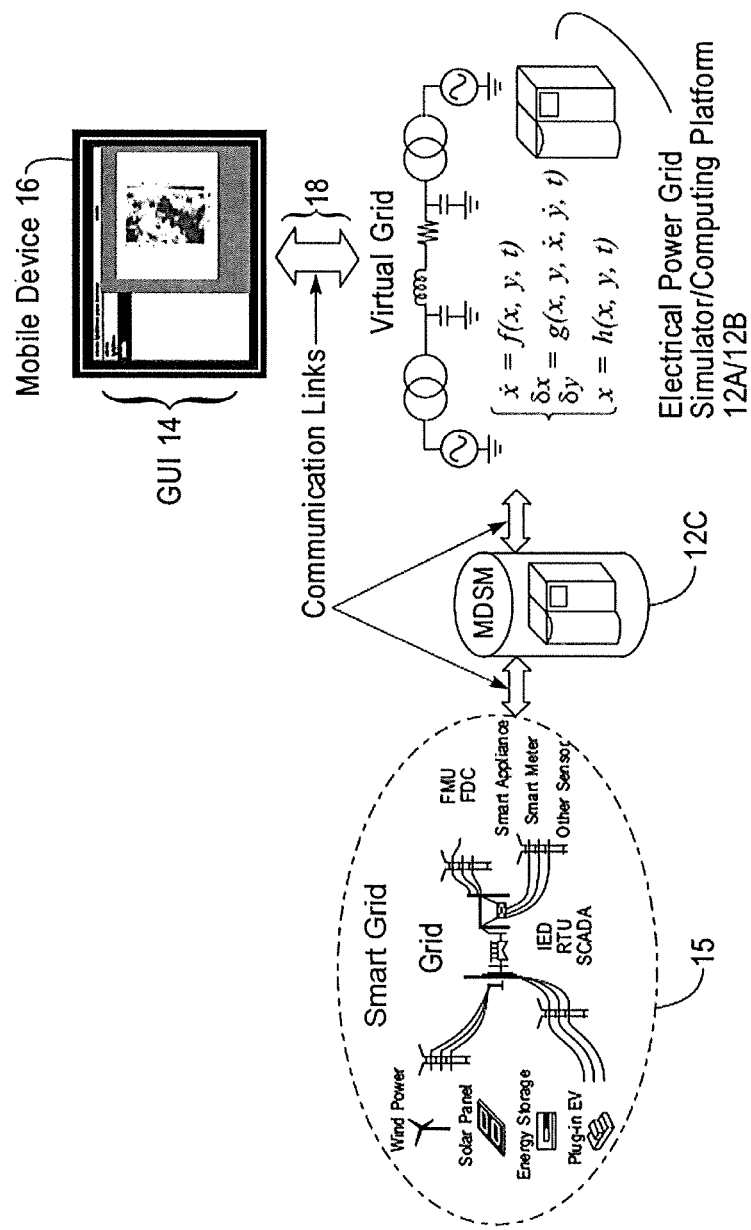
FIG. 1B shows another view of the system depicted in FIG. 1A.

FIG. 1A illustrates a high level block diagram of one non-limiting embodiment of a system 10 that is configured to implement the embodiments of this invention. The system 10 includes an electrical power grid simulator program 12A running on a high performance computing platform 12B. One suitable but non-limiting embodiment of the computing platform 12B is a Blue Gene®/Q system that is available from the assignee of this patent application. In this non-limiting embodiment the system 10 also includes at least one GUI 14 embodied in a mobile device 16 having wireless communication capabilities. Interposed between the mobile device 16 and the electrical power grid simulator 12A/computing platform 12B is a web server-based communication layer 18. It is assumed that some type of interface 12C is provided between sensors and other data generating components of a power grid 15 so that real-time operation of the power grid 15 can be monitored and simulated. The interface 12C may also provide connectivity to various actuators (e.g., switches, variable loads) installed in the power grid 15 enabling control over certain aspects of the power grid operations. As is shown in FIG. 1B the instrumented power grid 15 could be referred to for convenience as a 'smart grid' 15.

The computing platform 12B can be implemented using a number of processor nodes operating in parallel (e.g., in a SIMD architecture). Scenario parallelism can be implemented using one task for each scenario to be simulated and a scheduler process that is responsible for initialization of the individual tasks, synchronization between tasks, consolidation of results for communication back to the mobile device 16, calculation of statistics, etc.

As considered herein a mobile device 16 can be any type of device having some computation capability and interface capability with one or more external networks. The mobile device 16 can be assumed to include a capability to host the GUI 14. The network interface capability is preferably based on one or more types of wireless communication capabilities but can be implemented in whole or in part via a wired connection (e.g., a cable connected between the mobile device 16 and a port). Suitable examples of mobile devices include, but are not limited to, laptop computing devices, notebook computing devices, tablet computing devices, smartphones and, in general, any type of computing device having, preferably, an ability to wirelessly connect (e.g., via radio frequency signals and/or optical signals) with the web server-based communication layer 18. The mobile device 16 could be a commercial, off-the-shelf type of user communication device, such as a tablet, containing the GUI 14 software as an add-in application program, or it could be a specialized type of device designed and configured to implement the embodiments of this invention.

In any case the device that hosts the GUI 14, such as the mobile device 16, is assumed to have some minimal functionality including for example a central processing unit (CPU) or data processor 20 (e.g., a microprocessor) connected with one or more computer readable medium(s) that can be embodied as one or more memories 22, and with at least one type of wireless communication circuitry 24. In general the mobile device 16 can be assumed to include some type of user interface (UI) such as a display screen 26 and a user data input 28 such as a keyboard or keypad or a touch-sensitive surface (possibly part of the display screen 26) and/or a voice input and recognition system.

The memory 22 can be any type of memory device or multiple devices suitable for integration into the device. The memory 22 can be assumed to store native software 22A needed to operate the device, such as the mobile device 16, and to also store at least one application (APP) program or software 22B that is configured to operate in accordance with the embodiments of this invention. The at least one application (APP) program or software 22B can be assumed to include computer program instructions and software configured to implement the GUI 14 in cooperation with the display screen 26 and the user data input 28. Hereafter a reference to the GUI 14 can be assumed to include the GUI software stored in the memory portion 22B as well as the display 26 and user input 28. The memory 22 is also assumed to include some type of data storage 22C to store, for example, downloaded data, to store results of computations and results of simulations, and to store temporary variables and related data needed during computation/processing of the downloaded data.

The wireless communication circuitry 24 if present can be based on, for example, a low power, short range, local area technology such as Bluetooth™ or a WiFi-type of technology to enable communication with at least one access point (AP) 30. In some cases the wireless communication circuitry 24 will include a longer range, wider area wireless technology such as a cellular radio transceiver and related circuitry and software to enable communication with the least one AP 30. The AP 30 in turn provides connectivity via one or more networks 32 to the electrical power grid simulator 12A/computing platform 12B. The electrical power grid simulator 12A/computing platform 12B could be physically instantiated at some particular location or it could be virtualized and reside in a computing cloud 34. The web server-based communication layer 18 can be assumed to include all or some of the AP 30 and the one or more networks 32 including any applicable gateways, domain name servers (DNS) and the like.

It should be realized that while an exemplary embodiment of this invention employs the mobile device 16, in other embodiments the device that hosts the GUI 16 could be any type of user device such as a desktop computer or terminal, and the interface to the computing platform 12B could be a wireless interface or a wired interface using any type of conventional wireless or wired network(s) using any type of conventional data transmission protocols. Combinations of various types of networks can also be used to provide connectivity between the user device that hosts the GUI 14 and the computing platform 12B. As such it should be kept in mind that subsequent references to the mobile device 16 should not be interpreted in a limiting sense as to the type or types of user devices that can be employed to practice this invention.

FIG. 1B shows another view of the system 10. In this view the power grid, or 'smart grid' 15, is shown to include various power generators (e.g., public power plants, wind turbine generators, solar generators) plus energy storage equipment and plug-in EV units. The smart grid 15 also includes the transmission distribution grid per se such as high voltage, medium and low voltage lines along with transformers and related equipment. The smart grid 15 includes various sensors and related equipment to monitor the operation of the distribution grid including intelligent electronic devices (IEDs), remote terminal units (RTUs) and supervisory control and data acquisition (SCADA) systems. These sensors and related equipment can include phase measurement units (PMUs), phase data concentrators (PDCs) and various 'smart' appliances, meters and the like. These are connected with the interface 12C via various communication protocols and links including, for example, the internet, a private digital network and/or by using signals superimposed on the grid conductors themselves. The interface 12C can be embodied, for example, as at least one mass digital storage management (MDSM) unit that is connected with the electrical power grid simulator 12A/computing platform 12B. The operation of the electrical power grid simulator 12A/computing platform 12B can be considered to implement a 'virtual grid' whereby monitoring and simulations of the grid 15 can be carried out. The simulations can be based in part on the actual real time or near real-time data measured and reported by the various sensors via the interface 12C. The mobile device 16 containing the GUI 14 is bidirectionally connected with the electrical power grid simulator 12A/computing platform 12B via the web server-based communication layer 18. In some embodiments the communication layer 18 could be or could include a private digital network. In practice there could be many mobile devices 16 in use at any given time, where the mobile devices 16 could be distributed over a wide geographical area both within the geographical area of the grid 15 and external to the grid 15.

For those embodiments where the grid structure is an electrical power grid the electrical power grid simulator program 12A is preferably one that can solve a standard load flow problem for the steady-state sinusoidal voltages and power flows in a network, resulting from a specified pattern of loads and generation. The code can be based on principles as described, for example, in MATPOWER: Steady-State Operations, Planning, and Analysis Tools for Power Systems Research and Education, Ray Daniel Zimmerman, Carlos Edmundo Murillo-Sanchez, and Robert John Thomas, IEEE Transactions on Power Systems, Vol. 26, No. 1, Feb. 2011; MATPOWER 4.1 User's Manual, Ray D. Zimmerman, Carlos E. Murillo-Sanchez, Power Systems Engineering Research Center, Dec. 14, 2011; and Power System Load Flow Analysis, Lynn Powell, McGraw Hill, 2004.

The power system model of the electrical power grid simulator program 12A can contain a number of buses connected by branches in the desired network topology. The buses represent generators, loads, and/or connection substations, and each branch represents a transmission line and its associated transformer (such as a phase-shifting transformer). Since the model is meant to represent the transmission system, the loads can be represented as substations, and the distribution system attached to the output of the substations could be in some cases a level of detail not considered by the model.

Voltages are modeled as a complex quantity, with a voltage magnitude and phase angle. Power is a complex variable with the real part representing active power and the imaginary part representing reactive power.

There can be three kinds of buses considered in the model: a PV bus, a PQ, bus and a slack bus. In a PV bus, typically used to model generators, the active power and voltage magnitude are specified, and the reactive power and voltage angle are to be determined by simulation. In a PQ bus, typically used to model loads, the active power and reactive power are specified, and the voltage magnitude and angle are to be determined by simulation. In order to avoid over-specifying the problem, one generator can be modeled as a slack bus (and also serves as a voltage-angle reference). In this bus the voltage magnitude and angle are specified, and active and reactive power are to be determined by simulation. Buses can be grouped in the input/output data of the simulator, so that, for example, a particular bus can contain several generators and loads.

The branches can use a t transmission-line model, with parameters of complex impedance, total charging capacitance, and the tap ratio and phase shift of an ideal phase-shifting transformer attached to the from end of the branch.

The AC nodal power balance for the network can be expressed as a complex matrix nonlinear system of equations. This is separated into real and reactive components, yielding a system of nonlinear equations that are solved by numerical techniques such as Newton's method.

The electrical power grid simulator program 12A can operate in a single-step mode, in which the initial known values are specified and the unknowns are solved for, giving complete steady-state information on bus voltage magnitude and angle, generation and load active and reactive power injections at each bus, and active and reactive power flow and loss for each branch.

Alternately the simulator can perform multistep simulations in which certain resulting values are compared to allowable bounds, and out-of-bounds quantities are assumed to lead to component failure or operation mode changes. For example, excessive reactive power demand on a generator can result in the generator going off line, or the generator producing a fixed amount of active and reactive power (behaving like a PQ bus rather than a PV bus). Excessive power flow on a branch can cause the branch to trip and go out of service. After adjusting the model to reflect any failures or operation mode changes, the simulation can be run again, and the checking process is repeated. By continuing to iterate in this manner with changing loads and generation over time, studies of cascading failures may be performed.

It should be appreciated that the examples of the embodiments of this invention are not limited for use with any particular types of electrical power grid simulator programs, computing platforms, mobile and other types of user devices and communication buses and links. The embodiments shown in FIGS. 1A and 1B and described above are provided just as non-limiting examples of suitable technological contexts in which the embodiments of this invention can be realized. For example the simulation could be transient or dynamic in nature as opposed to steady state.

Because of the large amount of information required to prepare an initial scenario (case file) for the power grid simulator 12A it is preferred that these are set up a priori on a file system of the computing platform 12B. The GUI 14, however, does permit modification of existing scenarios or automatic generation of new scenarios.

An initial welcome screen presented by the GUI 14 allows the user to choose whether single or multiple starting scenarios are to be used. A single scenario to be used is chosen from a list of available scenarios. Multiple scenarios may either be chosen from available prepared sets of multiple scenarios, or they may be automatically generated. To automatically generate multiple scenarios the user picks an available starting scenario, the desired number of scenarios to be generated, and one of any available rules for generating multiple scenarios. For example, a rule could be to start with an initial scenario, and for each successive scenario, increase the active power demand on every load by 1%, such as might be experienced as air conditioners progressively come on line during a heat wave. Another rule can be to create a progression of generation increments or decrements. Still another rule could, for example, introduce random changes with various statistical distributions to simulate, for example, the variable injection into the power grid of renewable generation sources such as solar or wind power generators.

Yet another rule for creating multiple scenarios is related to performing a contingency analysis for either generators or power distribution branches of the power grid 15. For an N-1 contingency analysis, N scenarios are generated, where N is the number of generators (and/or branches), and each scenario (contingency being modeled) has a different one of the generators (and/or branches) disabled. For an N-k contingency, each of the binomial coefficient N choose k scenarios has k generators (and/or branches) disabled.

More generally the embodiments of this invention enables an N-k contingency analysis simulation to be performed and the results visualized, where k is equal to zero, 1 or greater, where binomial coefficient N choose k scenarios are generated, and each scenario has k generators and/or branches disabled. For the case where k=0 the simulation may simply enable the grid operation/status to be visualized without introducing any failure modes or contingencies in the grid structure.

After setting up the initial scenario(s), the user selects whether a one-step or a multi-step simulation by the power grid simulator 12A is desired. A one-step simulation computes the resulting state of the power grid 15 for each of the single or multiple initial scenarios. A multi-step simulation can begin in the same manner, but then checks for out-of-bounds values, modifies the power grid model to reflect unit failures, and re-runs the simulation. This process can iterate until a user-selected maximum number of iterations is reached, or until there are no further significant changes.

In one embodiment the power grid simulator 12A assumes, simply for convenience, that the power flows are in a steady state. However in other embodiments the power grid simulator 12A can operate equally well with a dynamical model.

The model resident at the computing platform 12A inputs various physical quantities that are measured from the power grid 15 via the interface 12C and uses these to calculate the physical quantities required to evaluate the overall 'health' of the grid 15, including for example when a given transmission line is close to or above safety tolerance levels. This information can be used to identify when various components of the grid 15 are likely to fail and to take steps to remediate the problem. Additionally, this information can be used to evaluate the power efficiency of the grid 15 and to adjust production to obtain increased efficiency.

For example, it is typically required that power utilities perform some type of N-1 contingency analysis used to answer the question, e.g., "What would happen if any one component of the system were to fail?" However, growing concern over the reliability of power grids has led to a call for N–2 and even N–k contingency testing where k>2. For a system with N components, N–1 contingency analysis requires N simulations; but for N–2, N(N+1)/2 simulations are required and for N–k there is a combinatorial expansion of the required number of simulations.

Use of the Blue Gene®/Q or similar supercomputer as the high performance computing platform 12B enables handling orders-of-magnitude more simulations than are currently possible, and allows an expansion beyond N–1 contingency analysis to increase overall system reliability and efficiency.

Figure 1C:
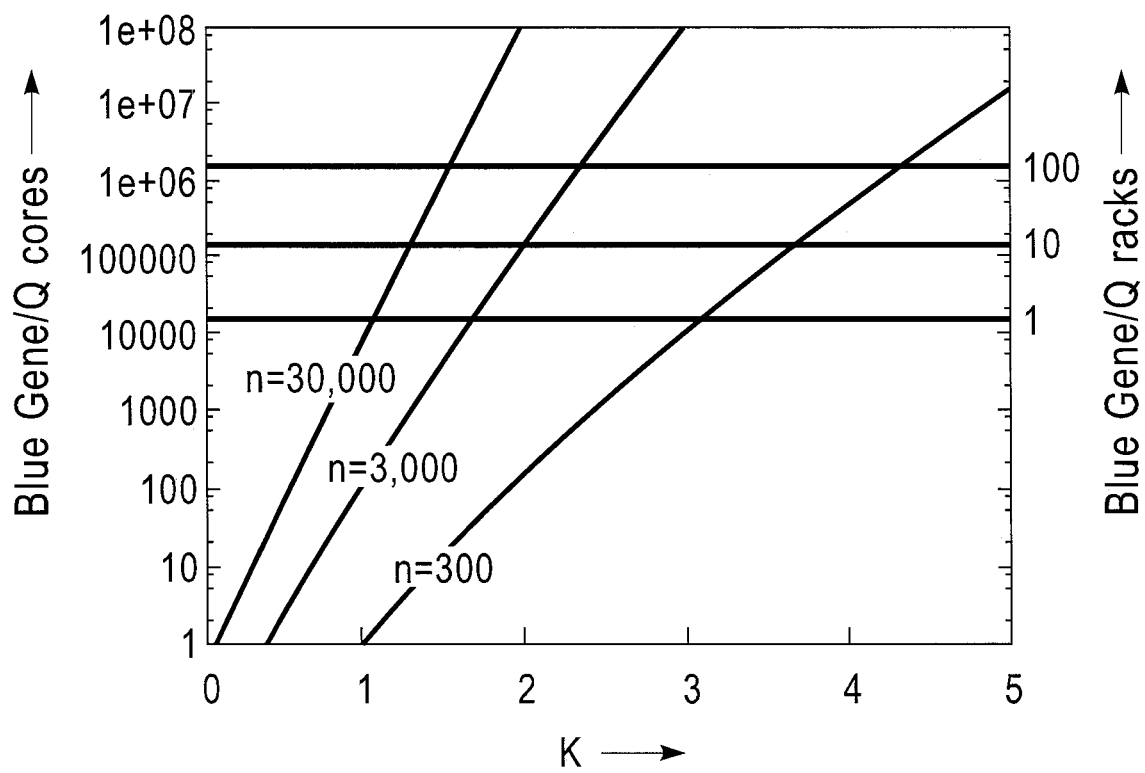
FIG. 1C is a graph that shows an example of N–k contingency hardware requirements, in this example an estimated number of Blue Gene/Q cores required to run an N–k contingency simulation in one minute, versus k.

For example, reference can be made to FIG. 1C that shows an example of N–k contingency hardware requirements, in this example an estimated number of Blue Gene/Q cores required to run an N–k contingency simulation in one minute, versus k. In general the needed computing power of the platform 12B is that required to complete a desired simulation in an acceptable amount of time (e.g., 1 minute for "real-time", 1 hour for "near real-time", etc.)

However, it should be appreciated that the embodiments of this invention do not require any specific type or class of computing platform 12B.

Further in this regard it should be realized that in some embodiments all or at least some of the computational and data storage and handling functionality of the computing platform 12B could be incorporated and integrated into the user device 16, and that in certain such embodiments the user device 16 could be interfaced to receive the outputs from the various grid 15 sensors via the interface 12C and the web server-based communication layer 18.

The mobile GUI 14 for contingency analysis provides convenience and ease of use, and renders complex information quickly and accurately. The GUI 14 is used to visualize the current state of the grid 15, to remotely initiate simulations on high performance computing platform 12B and to visualize the results of the simulations.

The GUI 14 can also be used in some embodiments to remotely control operations of the grid 15 and to remotely initiate remediation and other types of actions.

Figure 2:
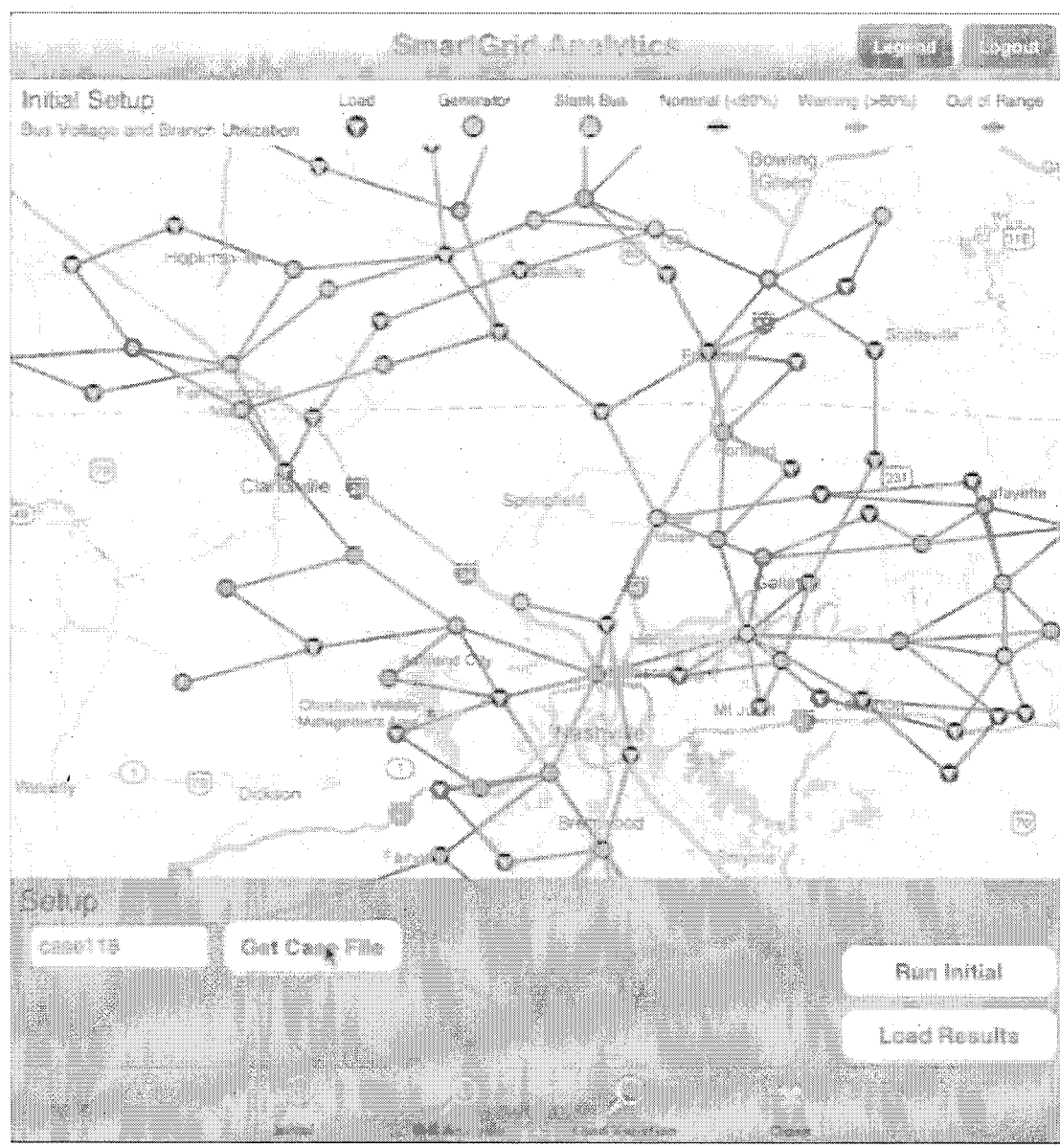
FIG. 2 shows an exemplary display at the mobile device shown in FIGS. 1A and 1B of an initial visualization of a grid system topology.

After the initial selection of a single starting scenario by the user of the mobile device 16 the GUI 14 displays a visualization of the system topology, such as the one shown by example in FIG. 2. The power grid 15 is laid out geographically on top of a map of the relevant area. The nodes of the power grid 15 are laid out according to their actual geographical locations relative to the map. By using standard mobile device 12 touchscreen finger movements the user can pan and zoom in or out, to facilitate broad overviews or detailed manipulations of a small part of a large network.

In one non-limiting example, and as is common in the power generation and distribution industry, circular icons represent generator buses, triangular icons represent load buses, and square icons represent buses that contain both generation and load. The lines between the buses represent the branches. In other embodiments different representations, indicia, indicators and icons can be used to represent these same and other parameters. In this invention tapping on one of the square bus icons on the GUI 14 can activate a popup display region with an icon for each generator and each load in the corresponding bus.

This operation can be accomplished at least in part by the mobile device 16 sending information descriptive of the bus icon selected by the user (e.g., at least geographical coordinates) to the computing platform 12B, the computing platform 12B returning the applicable bus-related information as obtained from the grid sensors via the interface 12C, and the GUI 14 formatting and rendering the returned information on the display screen 26.

Figure 3:
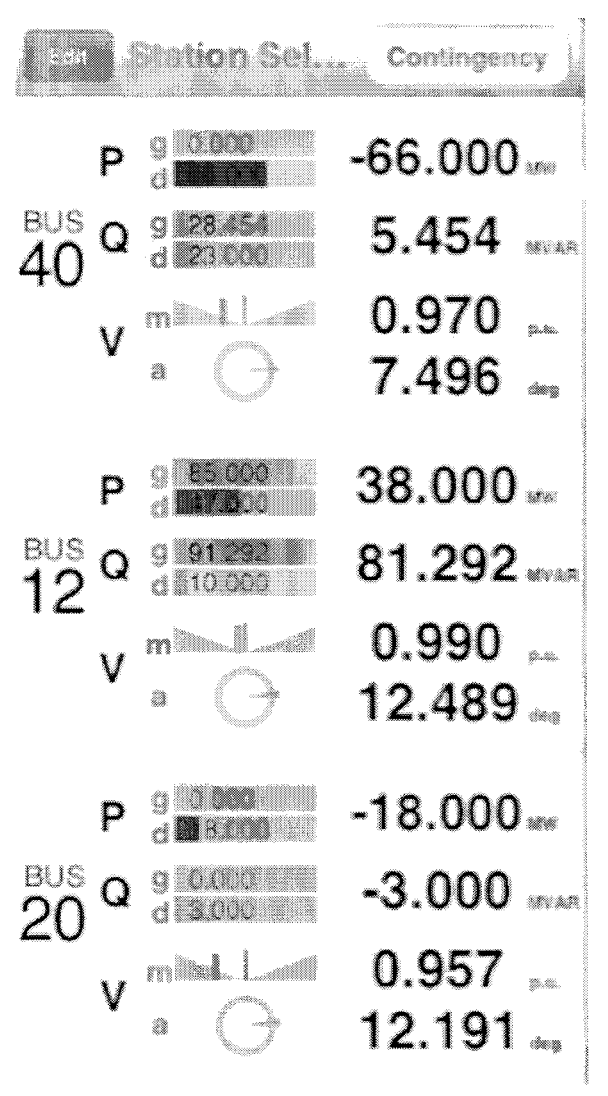

If it is desired to modify the parameters of any of the generators or loads, tapping on them opens a parameter modification/editing sidebar such as the one shown in FIG. 3. Modifiable values can then be changed by moving the sliders, such as by the user sliding a finger across the displayed slider. In the sidebar color coding can be used to indicate out-of-tolerance and in-tolerance conditions.

While this embodiment can be used to modify parameters for a simulation, in other embodiments the mobile device 16 can transmit the changed parameter(s) to the computing platform 12B that in turn can relay the changed parameters to the grid structure 15 for input to one or more of the applicable grid actuators. Alternatively the mobile device 16 can transmit the changed parameter(s) directly to a receiver associated with the grid structure 15 for input to the one or more applicable grid actuators. Thus, an aspect of this invention provides an ability send in response to a user input a command to the grid structure 15 in order to change a state of at least one grid structure actuator. This embodiment can imply the presence of any needed security and authorization layers in the communication stream between the mobile device 16 and the computing platform/grid.

Figure 4:
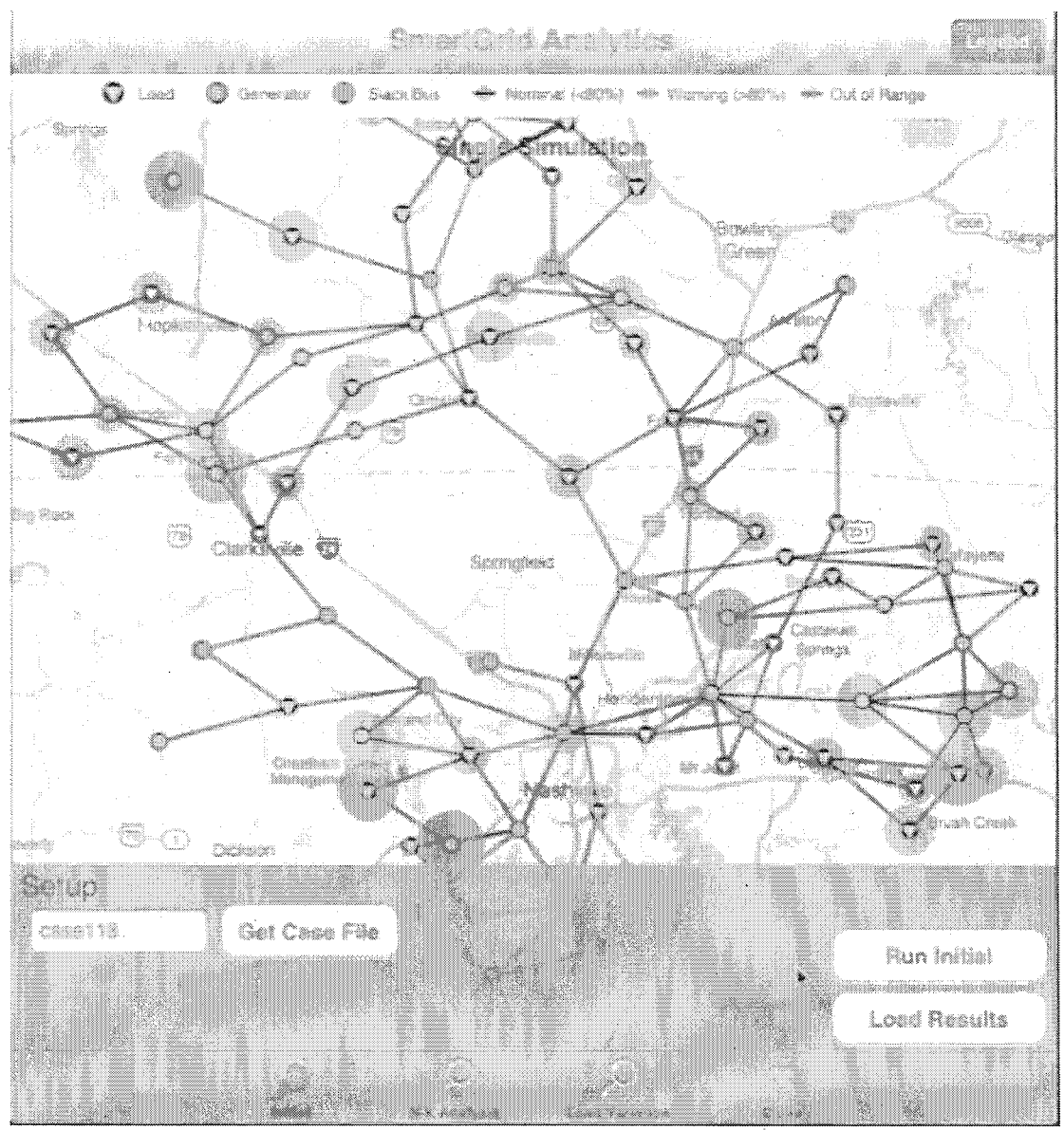
FIG. 4 shows an exemplary display at the mobile device shown in FIGS. 1A and 1B of a visualization of simulation results.

In the single scenario simulation once the initial scenario (s) are selected or generated using the GUI 14 in combination with the electrical power grid simulator program 12A running on the high performance computing platform 12B and if desired modified, the user taps a button that begins the simulation at the simulator program 12A. An example of the resulting computed system-state visualization for a particular simulation that is returned to the mobile device 16 is shown in FIG. 4.

Figure 9:
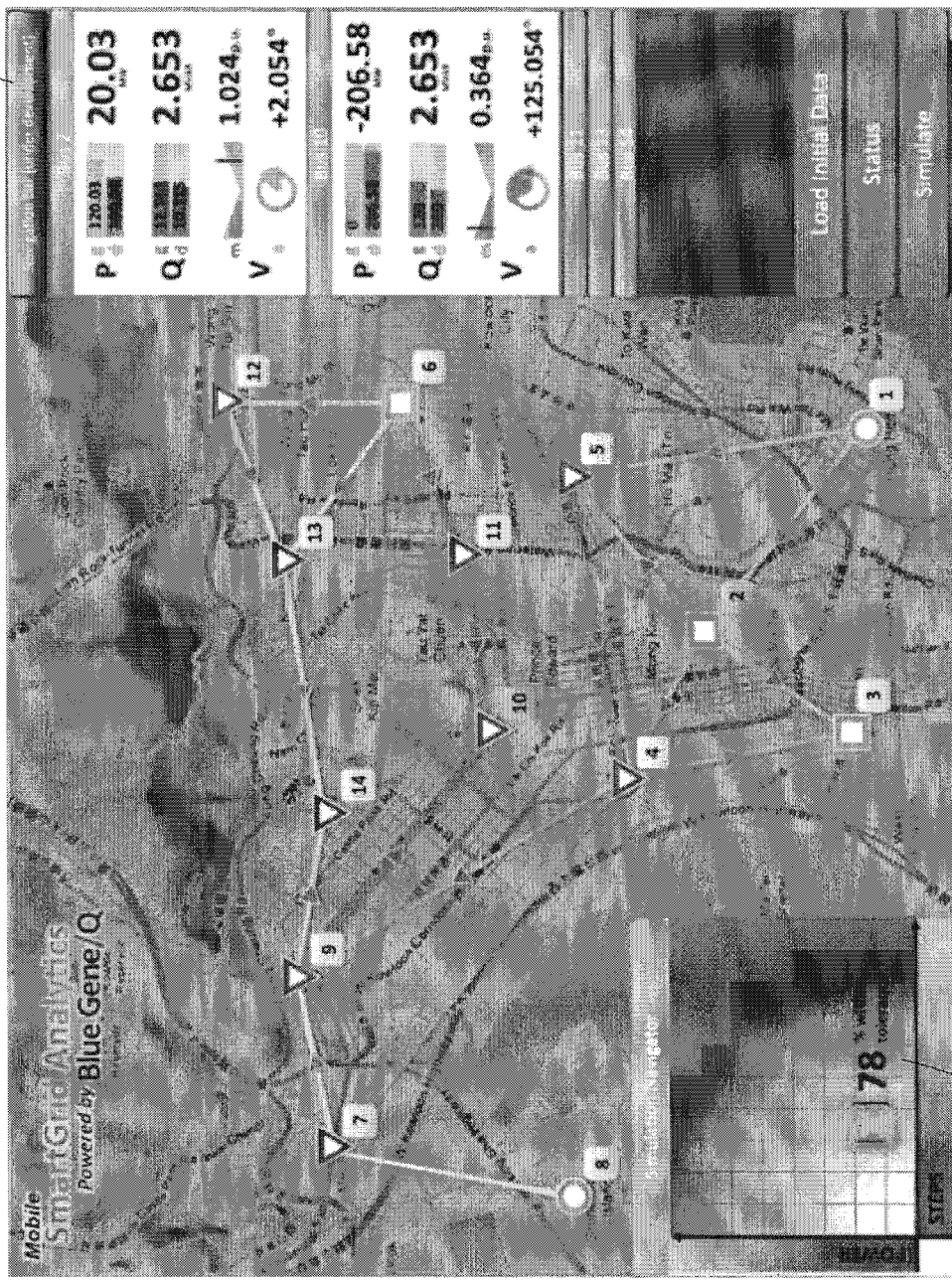
FIG. 9 shows an exemplary display at the mobile device shown in FIGS. 1A and 1B of a Simulation Navigator enabling a visualization of one of a plurality of simulation results.

In the non-limiting example that is shown more particularly in FIG. 9 the direction of power flow in the branches is indicated by arrows. The branches can be colored according to their utilization: e.g., blue for nominal (e.g., up to 80%), magenta for heavy (between 80% and 100%), and red when the maximum permissible utilization is exceeded. The discs around the buses can be colored and also sized according to voltage magnitude (Vm), where the larger the disk the more Vm differs from the nominal value. A blue color of a certain disc indicates that Vm is within tolerance, magenta indicates near the maximum or minimum allowable voltage, and red indicates out-of-tolerance. Note that the specific colors, icons, line types, etc., used in this non-limiting example are not limiting to the scope of the invention, as others could as well be used.

Figure 5:
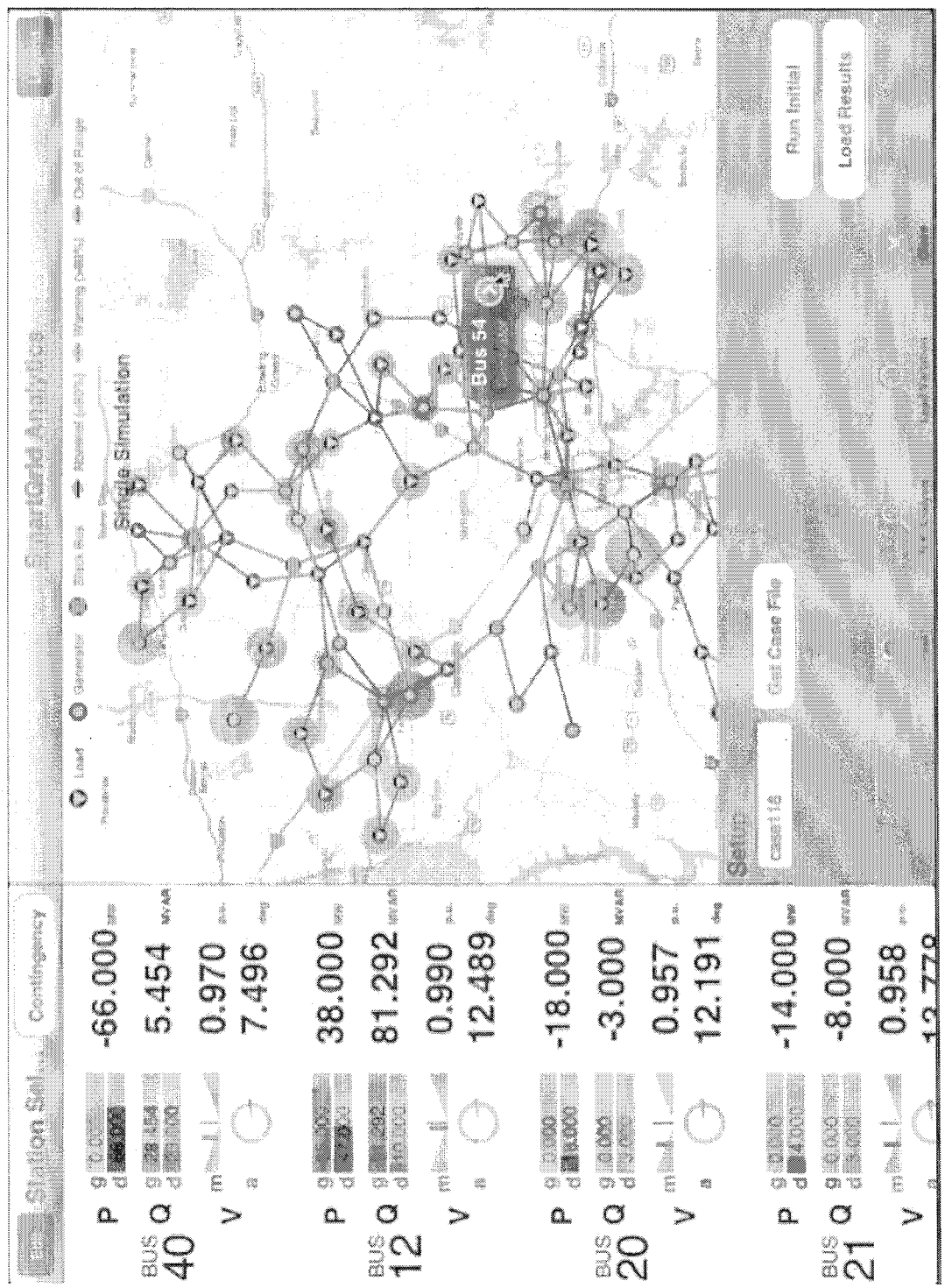
FIG. 5 shows an exemplary display at the mobile device shown in FIGS. 1A and 1B of individual bus information.
Figure 6:
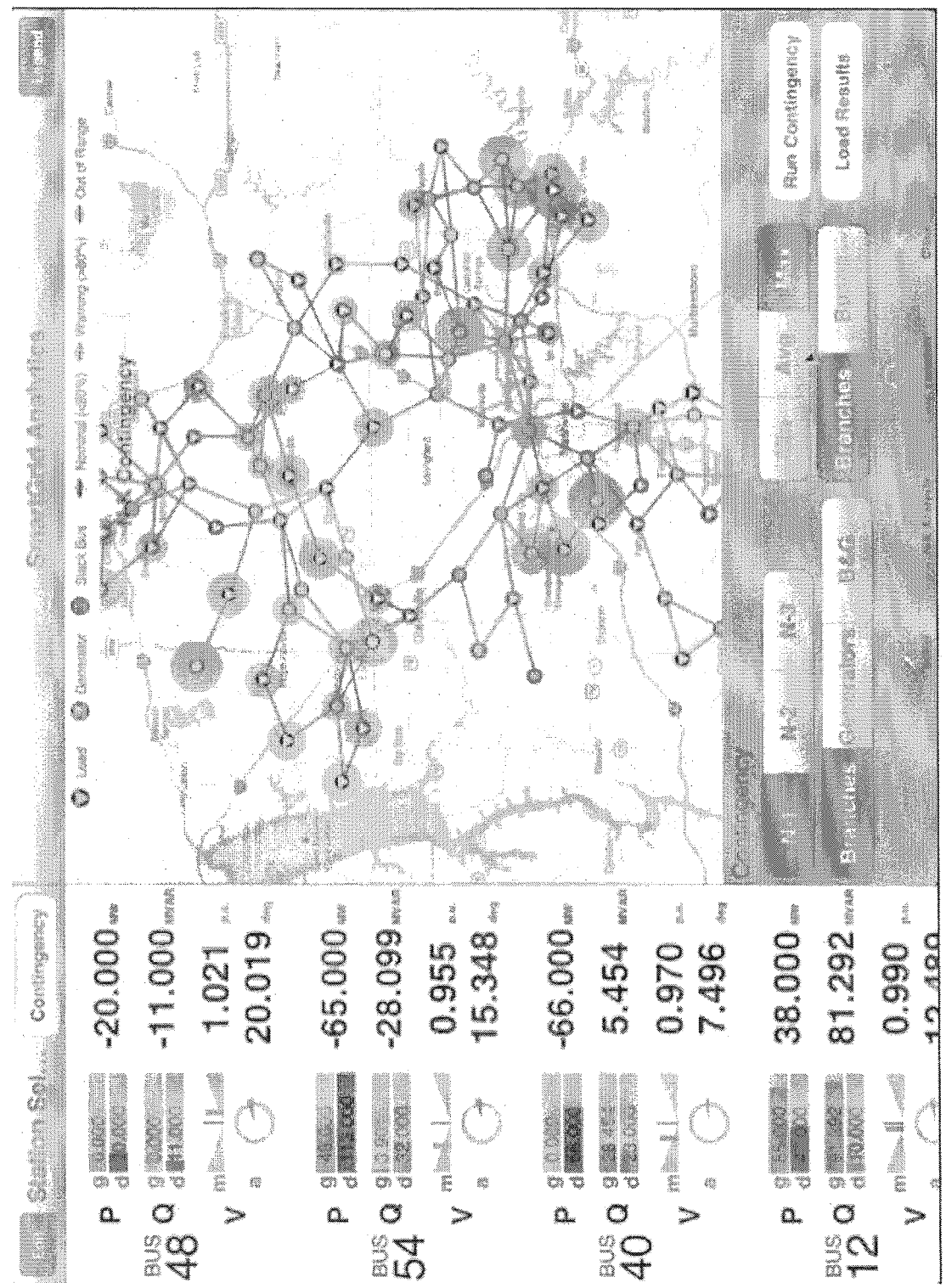
FIGS. 6-8 each show an exemplary display at the mobile device shown in FIGS. 1A and 1B of a summary visualization of N–1 contingency scenarios.
Figure 7:
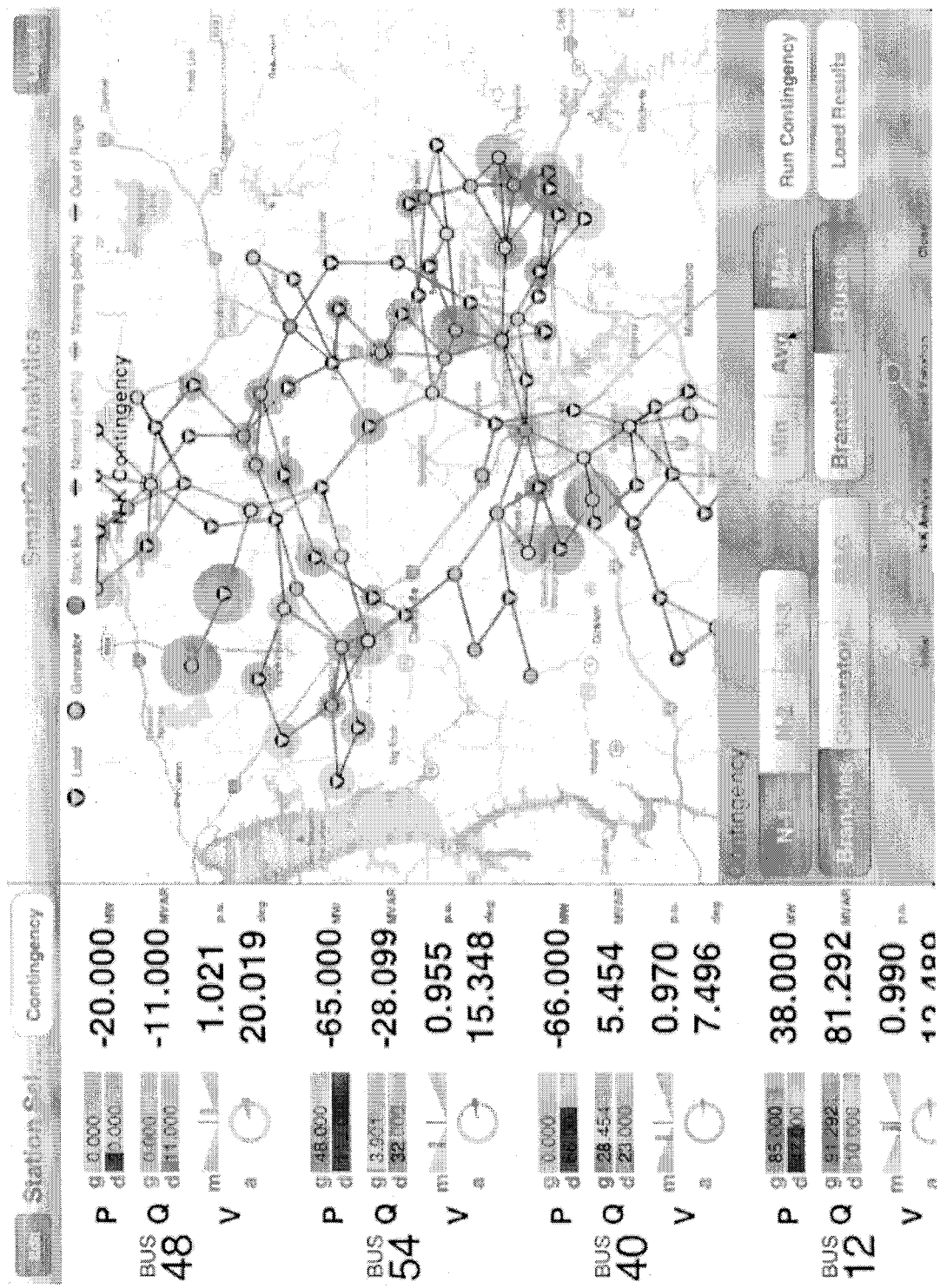
Figure 8:
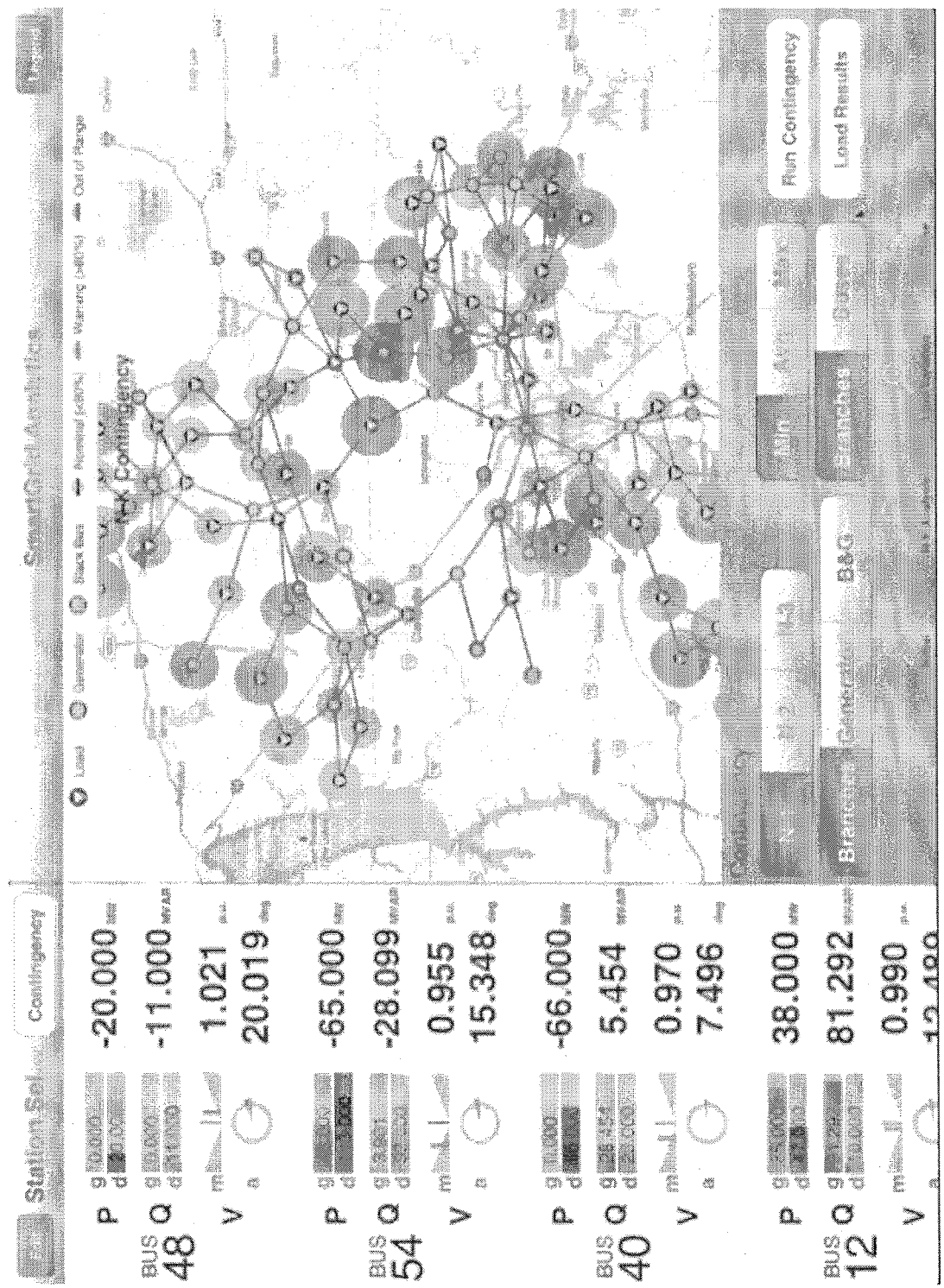

Detailed information for each bus or branch can be obtained by tapping on its icon as is shown in FIG. 5 for Bus 54. The tapping action results, in cooperation with the electrical power grid simulator program 12A running on the high performance computing platform 12B, in a sidebar being displayed for Bus 54 with graphical and numerical displays of the associated quantities. In FIG. 5 the quantities displayed for the selected buses are: Pg and Qg, the active and reactive power generation; Pd and Qd, the active and reactive power demand; Vm, the voltage magnitude; and Va, the voltage angle. Note that the specific data quantities displayed in this one embodiment of the invention are not meant to be limiting to the invention.

The GUI 14 provides a means of summarizing the results of multiple power flow simulations in various selectable ways and visualizing the resulting summary. FIGS. 6-9 show different summaries of the same set of N–1 contingency scenario simulations, in this case an N–1 contingency analysis on the branches. By selecting the Min, Avg, or Max buttons with either of the Branches or Buses buttons, the visualization can be made to show the Min, Avg, or Max branch utilization over all the scenarios, as well as the Min, Avg, or Max voltage magnitude at the buses over all the scenarios. The selection of Min, Avg, or Max can be independently made for branches and buses.

With respect to a non-limiting example that involves cascading failure simulations, and in the case of a multiple starting scenario, multi-step simulation, there is derived a desired type of multi-dimensional visual representation of the results of the simulation of at least one scenario. The visual representation can take any suitable form, such as a two-dimensional Cartesian graph or matrix, a polar coordinate graph, a pie chart, or a three-dimensional plot as but a few non-limiting examples. In the non-limiting case of the two-dimensional matrix of results: for each initial scenario there can be a sequence of simulations in time. The time can be linear time. In another example the time axis could be graduated by changes of state in the simulated system and could thus be considered as being non-linear. In some embodiments a time axis may be inferred. In some embodiments a time axis may not be present but some other parameter can be represented. For example, for a wind generation case one axis could be temperature or demand and the other axis could be wind speed. Further by example, for a solar generation case one axis could be temperature or demand and the other axis could be cloud cover.

These and other types of scenarios can be represented by a Simulation Navigator box 40 shown in the lower left corner of FIG. 9, where in this non-limiting example each square (which may be generally referred to as an 'indicator') represents or indicates the result of an individual simulation plotted over power (vertical axis) and steps (horizontal axis). The horizontal axis could also represent time. The resulting display can be viewed as a visualization of risk. Tapping on any one of the squares (indicators) in the Simulation Navigator box causes the visualization of that particular corresponding simulation result to be displayed on the GUI 14. This can occur by the user device 16 querying the simulation program 12A for the results of the identified simulation (if the simulation results have not been already stored in the user device 16). The results can be displayed using the sidebar 42 shown in the upper right corner of the GUI screen. It is also possible to view aggregated statistics over multiple results, such as minimum, average, and maximum asset utilization, or percentage of values out of bounds.

Note that in accordance with certain preferred embodiments of this invention each square (indicator) in the Simulation Navigator box can represent aggregate results of two or more simulations such as, by example, the average value of the results of ten simulations or the mean value of the results of 100 simulations. Those persons skilled in the art will recognize that the ability to represent and visualize this type of data is very advantageous as compared to conventional techniques for viewing a result of a contingency simulation, such as by simply reviewing charts, tables and columns of numbers.

Figure 10:
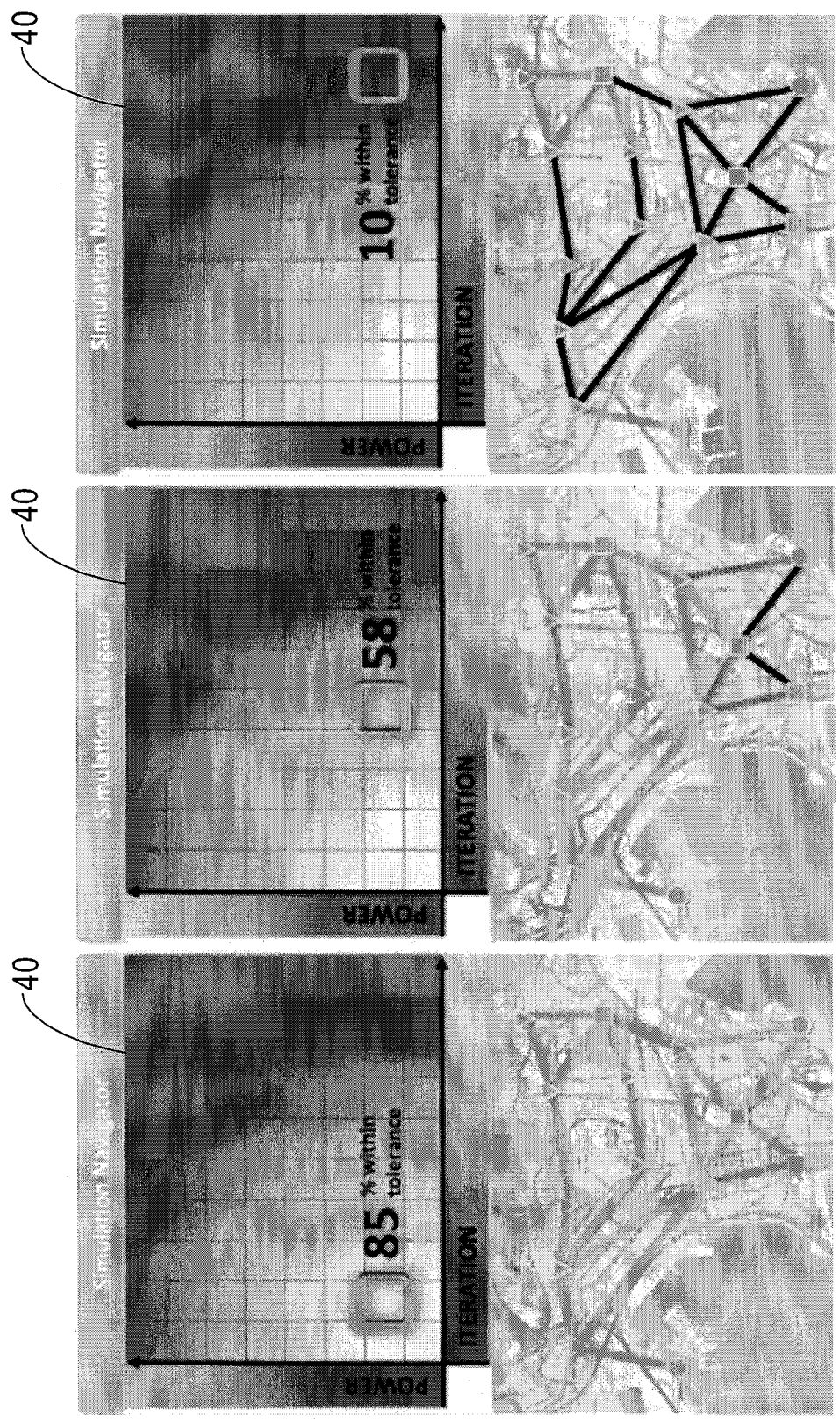
FIG. 10 shows the operation of the Simulation Navigator of FIG. 6 for enabling a visualization and navigation of multiple simulation results.

As is shown in FIG. 10, if the user slides a finger (or any appropriate pointing device) across a number of indicators the Simulation Navigator 40 initiates an animated slideshow of the chosen results to be viewed. This can be used to provide a visualization to the user of the progression of cascading failures.

It is also within the scope of these embodiments to respond to the user tapping on one of the indicators of the Simulation Navigator 40 by starting or launching an animation that visualizes the results of some number of underlying simulations. In this case time can be an implicit dimension. Cascading simulation failure results can thus be visualized. The underlying simulation could have been pre-computed and stored or some or all of them can be computed on the fly.

In the exemplary simulation displayed in FIG. 10 the grid experiences increasing failures with time (e.g., 85%, 58%, 10% within tolerance). Eventually a stable state is reached as shown in the rightmost depiction in which most of the branches are out of service (e.g., rendered as heavy black lines), except for two grid 'islands' that continue to operate due to, for example, a good match between local generation and demand.

Note that although the squares that form the display of the Simulation Navigator 40 could be shown with a color gradient, the colors, gradients, shapes, and layout are not meant to be limiting. For example, the squares could instead by circles, or the layout could be scrollable, stacked, or have some other configuration.

Figure 11:
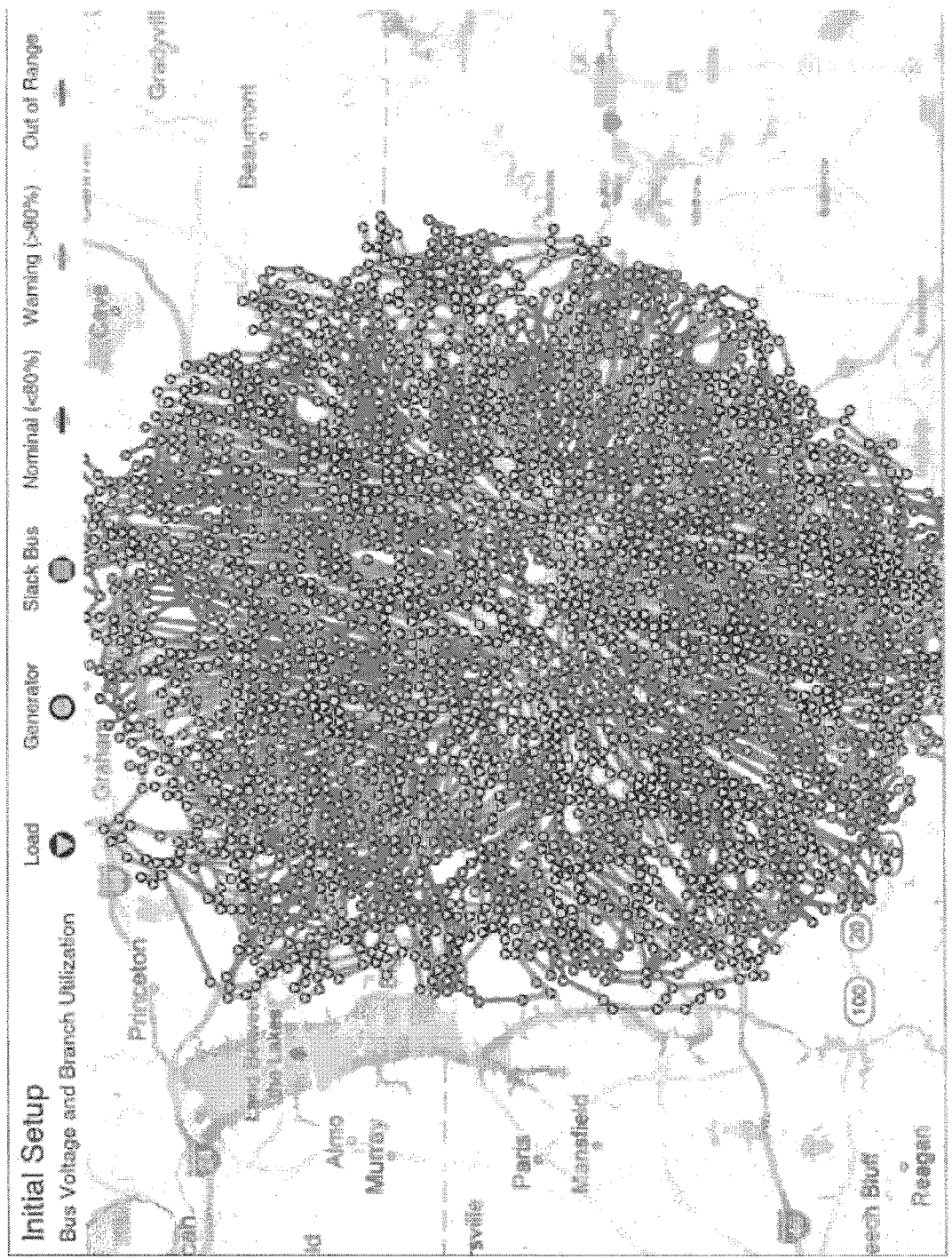
FIGS. 11-13 shows an exemplary display at the mobile device shown in FIGS. 1A and 1B of different views of an entire transmission grid, where
Figure 12:
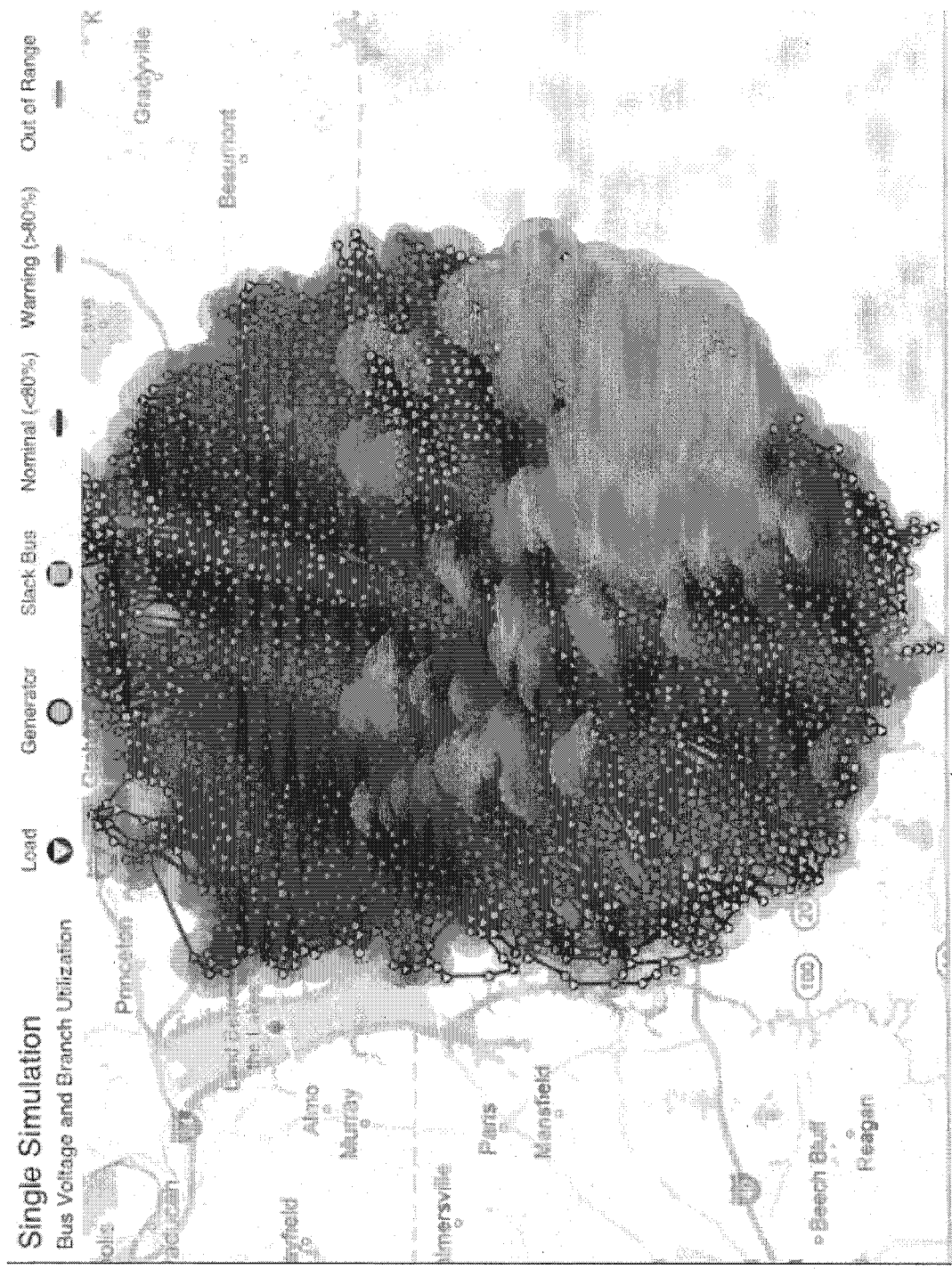
Figure 13:
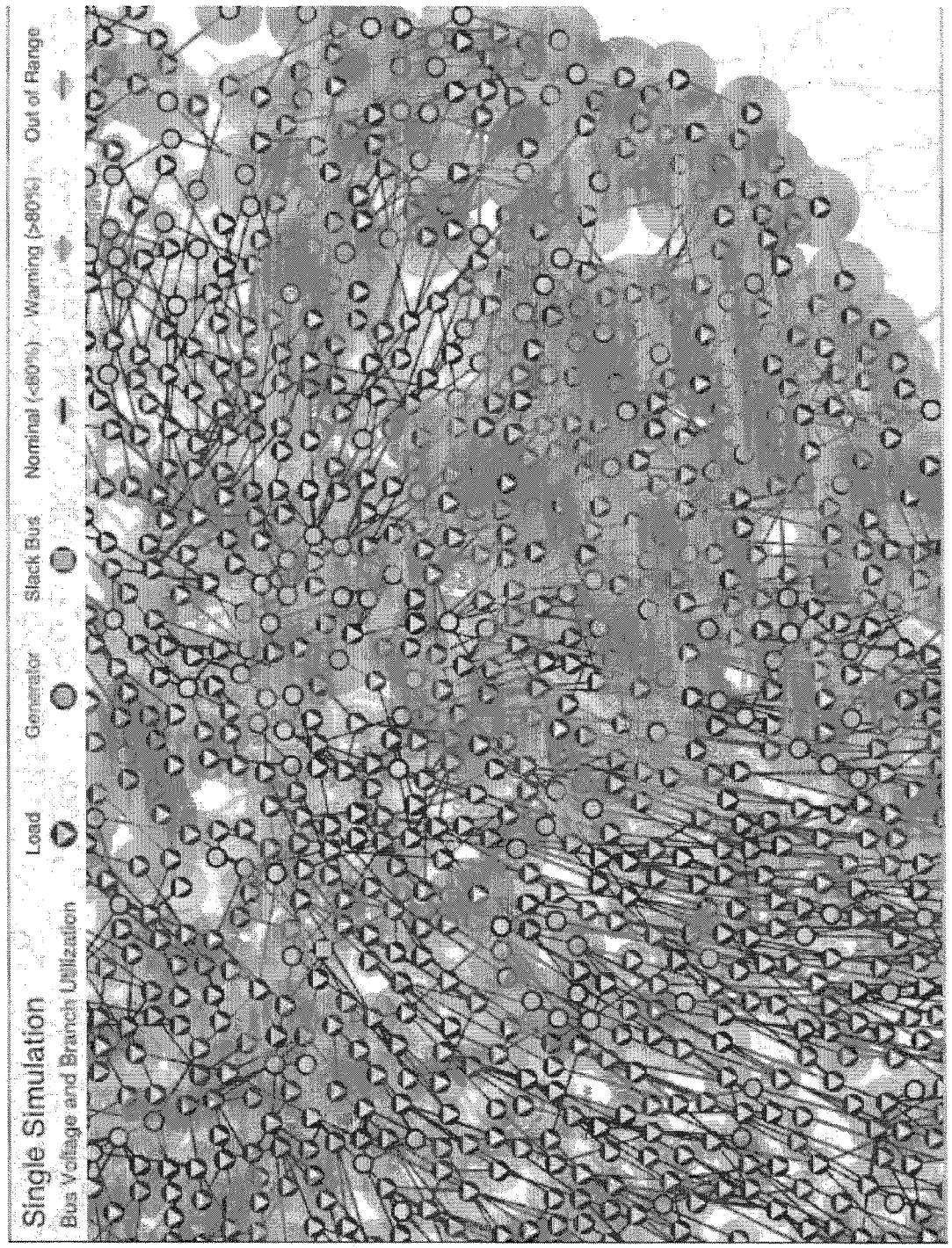

FIGS. 11-13 show another example of a grid visualization example that is made possible with the GUI 14 running on the mobile device 16. In this grid visualization example there are several thousand buses representing a particular transmission grid under peak-load conditions. FIG. 11 shows the overall (zoomed-out) grid topology and, as with the other visualizations, the layout of the nodes is chosen for topological clarity and may not correspond to actual geographic locations. FIG. 12 depicts a power-flow visualization of the same grid and FIG. 13 is a zoomed-in version of FIG. 12 showing just a portion of the buses, including those with the highest, possibly out-of-range power usage.

In FIGS. 11-12 color-coded regions can be used to represent under-voltage or over-voltage events so that such events stand out clearly. Zooming in on areas of interest (as in FIG. 13) allows more detail to be viewed, down to the level of specific localized numerical information by tapping on individual buses or branches.

In accordance with one aspect of this invention the GUI 14, can allow the user to interact with simulations that are currently running In one embodiment the user can visualize real-time grid data or evolving simulation data and interact with the simulation, requesting more detail as needed based on the evolution of the real-time visualization. For example, if during the visualization of a steady-state power-flow simulation the user observes what appears to be an unusual situation the user can click on a particular point on the grid to bring up a transient waveform analysis of that point. This avoids computing the more expensive transient simulation unless it is needed, speeding up response and more efficiently using computing resources.

In another embodiment the user can take a real-time 'snapshot' of the status of the grid and then use that grid data as the starting point for a contingency analysis simulation.

In yet another embodiment the user can have a long-running simulation running on the computing platform 12B and be receiving periodic updates of the visualization as the simulation results become available. In this case the user can interact with the simulation by modifying the future path of the simulation based on the visualization. For example, in the case of a cascading failure simulation a certain path may be observed that is of no interest to the user, and the user can instruct the simulator to prune the simulation scenario space to concentrate available computing power on the remaining interesting paths, to make them complete more quickly.

It can be appreciated that when simulating certain examples of considerable size and complexity the ability of the GUI 14, in combination with the electrical power grid simulator program 12A running on the high performance computing platform 12B, can render a visualization that conveys at-a-glance the overall health of the grid. This type of visualization would not otherwise be accessible to a power grid operator or other user; instead the user would need to review this type of data in the context of large printed tables with numerical values, making pattern detection, interpretation and diagnosis extremely difficult. One significant advantage of the visualization made possible by the use of the embodiments of this invention is that a wide scope can be made visible without sacrificing the ability to also view detailed, lower-level data such as is currently presented as tables of numbers. This can be accomplished by simply by clicking, touching and/or zooming in on the area of interest. FIG. 12 represents one example of this type of visualization that is made possible by the use of this invention.

As should be apparent the embodiments of this invention provide for a visualization on the GUI 14 to be comprised of graphical-type images as well as alphanumeric-type information expressed in any convenient format such as in a table for further specifying a result or a partial result of a simulation or simulations.

Another aspect of the embodiments of this invention is that the user is enabled to select a portion of a displayed grid (e.g., a power distribution grid). The mobile device 16 sends to the computing platform information that describes the selected portion of the grid, e.g., bounding geographic coordinates, and a type of simulation to be performed. In response the electrical power grid simulator program 12A then performs the desired type of simulation within the user-selected portion of the grid. That is, only a portion of the overall grid that is of interest to the user can be selected and simulated.

In an example of an information flow made possible by the use of the system 10 one can consider the following steps.

1. The user selects the desired simulation scenario using the GUI 14. The mobile device 16 then sends a request to a server associated with the computing platform 12B for the associated simulator input file.

2. The simulation case files can be stored on the file system (e.g., a parallel file system such as one known as General Parallel File System (GPFS™)). The GPFS™ is an example of a high-performance shared-disk clustered file system and can be attached to the computing platform 12B. The server copies the correct file from the file system.

3. The server then returns the location of the input file to the mobile device 16.

4. The mobile device 16 downloads the input file from the server, renders the grid visualization, and displays it to the user.

5. The user may make changes to the simulation scenario using the GUI 14. The mobile device 16 then makes changes to the input file based on the user's input. The user can also specify the kind of simulation that is to be run.

6. The mobile device 16 sends any changes, as well as the kind of simulation desired, to the server.

7. The server sends the changed input to file system.

8. The server runs code such as a script or an application on the computing platform 12B that dispatches a job for the requested simulation to the compute nodes of the computing platform 12B, which then run the simulation and writes the output file to the file system.

9. The server monitors the file system to determine when the output file is ready. Once ready, the server copies the file from file system to its own file system.

10. The server informs the mobile device 16 where the output file is on the server.

11. The mobile device 16 downloads the output file from the server.

12. The mobile device 16 renders the visualization from the output file and displays the results to the user.

In general a grid can be comprised of a transmission grid or grids and/or a distribution grid or grids, and all of the attendant systems and subsystems thereof known to those skilled in the art. Sensors can be configured at grid elements (or a subset of elements) to be modeled. An apparatus is configured for collecting sensor data to a central or distributed computing facility. The computing facility includes at least a computer program configured to model the behavior of the transmission grid based on a known or an estimated topology of the grid and components of the grid; on a known, measured or estimated power production (e.g., from public power plants, private solar panels, or wind farms, etc.); and on a known, measured or estimated power demand. The computer program can provide real-time information about the transmission grid system to at least one user device, such as a tablet-based computing device or a laptop computing device or any type of computing device capable of hosting the GUI 14. The information transferred can be conveyed over one or more wireless links alone or in combination with one or more wired links. The combination of the computer program at the computing facility and a computer program installed in the user device enables a user to initiate and interact with a transmission grid simulation to dynamically modify the grid structure both speculatively (in a "what-if" mode to determine and visualize the impact of hypothetical changes to the grid) and on-demand (in a "command" mode to modify the actual operational parameters of the grid, e.g., increasing supply or shutting down a transmission line.)

As should be appreciated there has been described a system and method for modeling, simulating and/or visualizing the operation and flow on a grid of arbitrarily interconnected nodes comprised of a modeling module, a simulation system, a user I/O device, a grid input module, a grid output module, a simulation analysis module and possibly a grid control device. The simulation module can be configured to simulate as non-limiting examples power grids, communication grids, water distribution grids, electric grids on integrated circuits, etc., as well other types of complex multi-dimensional structures and systems and grids having nodes that are interconnected by pathways, branches and conduits that can convey energy, fluid, radiation, motor vehicles (a network of roadways forming a transportation grid), aircraft (a three-dimensional air traffic control grid), etc. The system 10 includes a computer system 12B running a program 12A to simulate a model that could be in some embodiments a steady state or a dynamic power flow simulation, contingency analysis simulation, cascading failure simulation, etc.

The user I/O device embodied in, for example, the mobile device 16 includes a visualizer for displaying a graphical representation of the state of the grid or grid simulation at past, current or future times, and can include a user input device possibly with a touch enabled screen to direct and control the operation of the simulation including setup, run time and analysis.

The grid input module provides a means to read pre-stored grid data from a data base and/or to input real-time sensor data from an actual physical grid. The grid output module includes a storage device for simulation output and analysis by the simulation analysis module. The grid control device may be used to control the operation of an actual physical grid based on the results of the output from the analysis module and/or the user IO device.

In accordance with this invention the user can interact with simulations that are currently running (enabled by high speed computation, massive parallelism and flexible user interface).

The computer system could be implemented as a single-processor computer, as a multi-processor computer, or as a supercomputer, for example Blue Gene®/Q or similar supercomputer. In some embodiments the computer system could be integrated in whole or in part in the user device 16.

The visualization presented on the user I/O device could contain, for example, one or more of visualization of power flow through the branches of the grid, which may include active and reactive power flows, phase angles, and maximum, average, or minimum values over a variety of scenarios, and/or any other grid characteristics that are known to those skilled in the art.

The visualization of generation and demand at the nodes of the grid can include, for example, one or more of active and reactive generation and demand, phase angles, and maximum, average, or minimum values over a variety of scenarios, and/or any other grid characteristics that are known to those skilled in the art.

The visualization presented on the user I/O device can provide a user with knowledge of multiple (e.g., thousands of) contingencies of a complex system.

The visualization presented on the user I/O device can provide a user with various representations such as maps showing a result of random or pseudo-random perturbations of the grid structure.

The initial user setup can include selection of initial system states for the simulation, selection of a schedule of system condition variations whose effect on the grid is to be simulated, which may include one or more of a schedule of load variations, a schedule of generation variations, a schedule of load, generation, and/or branch failures. The selections may be performed by the user by selecting individual nodes or branches to modify, selecting regions that include multiple nodes or branches to modify, for example by 'lassoing' them on the display screen 26. The initial selection can include as starting data some stored historic grid data or it can include real-time grid data captured by the grid sensors prior to the start of the simulation, and possibly captured as well during the simulation. In some embodiments a live data feed from the grid sensors can be employed and the simulation can use periodic snapshots of the grid data in substantially real-time or near real-time. The initial selection can also include the user selectively specifying certain scenarios via the GUI 14, such as adding an element to the grid structure (e.g., adding a new generator at a certain location within the grid structure) or replacing an existing element with another element (e.g., replacing a solar generator with a wind generator). The embodiments of this invention enable various grid structure characteristics to be visualized including as non-limiting examples one or more of grid integrity, localized grid operational status and a summary of the overall operational status of the grid structure. The embodiments of this invention can thus be seen to find utility as a planning tool.

The storage device associated with the computing platform 12B may be a high-performance parallel file system. A non-limiting example includes GPFS™.

The embodiments of this invention can be considered in some aspects thereof as providing a failure map or a risk map or a heat map of failures and potential failures in the grid structure.

The embodiments of this invention also encompass a 'differential' visualization mode of operation where what is displayed to the user represents a difference between two (or more) simulation results that represent a difference between two (or more) grid states. For example, one simulation result may be a historical (stored) simulation result while another simulation result may be a current simulation result. The results are compared and what is visualized is the difference between the simulation results. In another example one simulation result may have as a simulation scenario an ambient temperature of 72° F. while a second simulation result may assume an ambient temperature of 76° F. This mode of operation enables the user to readily compare a difference between the two or more grid states and the effect on the operational status of the grid structure. A fixed or an adjustable threshold value may be used to filter out difference values resulting from noise events or random fluctuations in some grid parameter(s) thereby causing only meaningful grid simulation result differences to be shown to the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a 'circuit', a 'module' or a 'system'. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a single local computer, partly on the local computer, as a stand-alone software package, partly on the local computer and partly on a remote computer or entirely on the remote computer or server. In the latter scenario, the remote computer may be connected to the local computer through any type of network, including a LAN or a WAN, or the connection may be made to an external computer (for example, through the Internet using an Internet Service Provider).

Aspects of the present invention are described with reference to diagrams of methods, apparatus (systems) and computer program products according to embodiments of the invention. It will be understood that any methods can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the specified functions/acts.

These computer program instructions may also be stored in a computer readable medium that can direct a computer, other programmable data processing apparatus, or other devices to function in a particular manner, such that the instructions stored in the computer readable medium produce an article of manufacture including instructions which implement the specified function/act.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the specified functions/acts.

The block diagrams in the Figures illustrate the architecture, functionality, and operation of possible implementations of systems, methods and computer program products according to various embodiments of the present invention. In this regard certain blocks may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. As such, various modifications and adaptations may become apparent to those skilled in the relevant arts in view of the foregoing description, when read in conjunction with the accompanying drawings and the appended claims. As but a few examples, those skilled in the art may contemplate the use of other similar or equivalent computer systems, user devices, grid structures and types of grid structures, communication links, interface components and the like. However, all such and similar modifications of the teachings of this invention will still fall within the scope of this invention.

What is claimed is:

1. A system comprising:
a computing platform comprising a first interface to receive inputs from sensors that comprise a part of a grid structure comprised of at least one of a power transmission grid or a power distribution grid, the computing platform configured to execute an electrical power grid simulator program and further comprising a second interface configured to communicate with at least one user device through a communication layer;
the at least one user device connected with the computing platform through the communication layer, the user device comprising a graphical user interface, at least one data processor, and at least one non-transitory computer readable medium that stores program instructions, where execution of the stored program instructions causes the user device to specify, in response to input from the graphical user interface, at least one initial condition and a type of simulation to be performed by the electrical power grid simulator program based on the at least one initial condition, where specifying the type of simulation with said user interface comprises selecting a region of a geographical area visualization of the grid structure comprising at least one of individual nodes or branches of the grid structure on a map such that a simulation corresponds to the selected region, by specifying a physical boundary of the region comprising the at least one of individual nodes or branches of the geographical area visualization on the user interface while a size of the geographical area as perceived to the user stays constant;

to transmit the specified type of simulation and the at least one initial condition from the user device to the computing platform;

to receive from the computing platform a result of the simulation at the user device, the simulation being based on at least one of a steady state model of the grid structure or a dynamical model of the grid structure;

to visualize the result of the simulation with the user interface, where a visualization of the result comprises a result of at least one scenario of the simulation;

wherein visualizing the result of the simulation comprises displaying a multi-dimensional representation comprised of indicators arranged together as a graphical simulation navigator overlaid on the graphical user interface while the graphical user interface provides a visualization of power transmission or distribution of the geographical area on the map, where each indicator corresponds to at least one simulation result, where a user selection of one of the indicators generates a visualization of the corresponding at least one simulation result within the graphical user interface as a graphical plot having a horizontal axis and a vertical axis to provide a visualization of risk, and where the graphical simulation navigator being overlaid on the graphical user interface renders a portion of the visualization of power transmission or distribution of the geographical area on the map not visible; and to control operation of the grid structure using the at least one user device.

2. The system as in claim 1, where the visualization of the result of the simulation comprises at least one of power flow, generation or demand of the grid structure comprising one or more of active and reactive power flow, generation or demands, phase angles, maximum, average, or minimum values and other relevant parameters of interest.

3. The system of claim 1, where execution of the stored program instructions further enables the user device to provide at least one of a failure map, a risk map, or a heat map of failures and potential failures in the grid structure.

4. The system of claim 1, wherein the system is further configured such that in response to a pointing device being slid across a number of the indicators of the graphical simulation navigator to select the number of the indicators, the system initiates an animated slide-show of simulations to be viewed at least with corresponding respective portions of the geographical area of the map corresponding to the selected number of indicators.

5. The system of claim 1, wherein the visualization comprising the graphical plot corresponding to the at least one simulation result generated as a result of user selection of one of the indicators is provided within a sidebar within the graphical user interface adjacent to the geographical area on the map.

6. The system of claim 1,
wherein the simulation scenarios are performed in parallel by the computing platform; and
wherein the computing platform is a supercomputer connected remotely to the user device.

7. The system of claim 1, further comprising a plurality of user devices distributed over a geographical area that comprises the power transmission grid or power distribution grid and external to the geographical area that comprises the power transmission grid or power distribution grid.

8. The system of claim 1, wherein the computing platform is integrated with the user device such that the user device comprises the first interface to receive the inputs from the sensors that comprise a part of the grid structure comprised of the at least one of the power transmission grid or the power distribution grid.

9. The system of claim 1, wherein the graphical simulation navigator having the multi-dimensional representation comprised of indicators is configured as a separate scrollable graphical simulation navigator box overlaid on the graphical user interface.

10. A data processing system comprised of at least one data processor and at least one memory medium connected with the at least one data processor, the at least one memory medium storing computer program instructions that are executable by the at least one data processor, the data processing system further comprising:

a user interface having a user input configured to specify a type of simulation to be performed and at least one initial condition, where the simulation is executed by a simulation program using at least in part one or more sensor inputs from a grid structure comprised of at least one of a power transmission grid or a power distribution grid, said user interface further having a display to visualize a representation of a result of a simulation of at least one scenario by presenting a multi-dimensional representation comprised of indicators arranged together as a graphical simulation navigator overlaid on the user interface while the user interface provides a visualization of power transmission or distribution of a geographical area on a map, where each indicator corresponds to at least one simulation result, where said user interface, in response to a selection of one of the indicators by a user, generates a visualization of the corresponding at least one simulation result within the user interface, and where the graphical simulation navigator being overlaid on the user interface renders a portion of the visualization of power transmission or distribution of the geographical area on the map not visible;

where specifying the type of simulation with said user interface comprises selecting a region of the geographical area visualization of the grid structure comprising at least one of individual nodes or branches of the grid structure on the map such that the simulation corresponds to the selected region, by specifying a physical boundary of the region comprising the at least one of individual nodes or branches of the geographical area visualization on the user interface while a size of the geographical area as perceived to the user stays constant; and where at least one user device controls operation of the grid structure.

11. The data processing system of claim 10, where the simulation is based on at least one of a steady state model of the grid structure or a dynamical model of the grid structure.

12. The data processing system of claim 10, where the simulation enables real-time or near real-time operation of the grid structure to be monitored and simulated.

13. The data processing system of claim 10, where the visualization of the result of the simulation comprises at least one of power flow, generation or demand of the grid structure comprising one or more of active and reactive power flow, generation or demands, phase angles, maximum, average, or minimum values and other parameters of interest.

14. The data processing system of claim 10, where said user interface is further configured to enable the user to interact with at least one running simulation to visualize with said display real-time grid data or evolving simulation data, and to request via said user input additional simulation detail.

15. The data processing system of claim 10, where specifying the type of simulation with said user interface comprises at least one of a selection of initial grid states for the simulation, or a selection of grid structure variations whose effect on the grid structure is to be simulated, where initial grid states can be based on historical grid structure data or on real-time grid structure data captured at least in part by the one or more sensor inputs.

16. The data processing system of claim 10, where the visualization of the result of the simulation provides periodic visualization updates as further simulation results become available to be visualized, and where said user interface is further configured to enable the user to interact with a running simulation to modify a future path of the running simulation based on the visualization.

17. The data processing system of claim 16, where enabling the user to interact with the running simulation enables the user to prune a simulation scenario space in order to concentrate available computing power on simulation paths of interest to the user.

18. The data processing system of claim 10, where specifying the type of simulation with said user interface further comprises enabling the user via said user input to selectively add at least one element to the grid structure, to selectively remove at least one element from the grid structure, or to selectively replace at least one existing element of the grid structure with another element.

19. The data processing system of claim 10, where the visualization of the result of the simulation is comprised of graphical-type images and also alpha-numeric information for further specifying a result of a simulation or simulations.

20. The data processing system of claim 10, where the visualization of the result of the simulation displays a graphical representation of a state of the grid structure or grid structure simulation at past, current or future times, and responds to user activation of said user interface to direct and control operation of the simulation including setup, run time and analysis.

21. The data processing system of claim 10, where the visualization of the result of the simulation shows either an aggregation of results of at least two simulations of the grid structure, or a difference between results of at least two simulations of the grid structure.

22. The data processing system of claim 10, where specifying the type of simulation with said user interface further comprises specifying multiple simulation scenarios, and further comprises selecting a starting simulation scenario, a number of simulation scenarios to be generated, and specifying at least one rule to be applied for generating the multiple simulation scenarios.

23. The data processing system of claim 10, where said user interface is further configured to send in response to a user input a command to the grid structure in order to change a state of at least one grid structure actuator.

24. The data processing system of claim 10,
the at least one user device being a mobile device that is connectable via at least one wireless interface to a computing platform where the simulation is performed;
wherein the mobile device is configured to remotely control the simulation performed at the computing platform.

25. The data processing system of claim 10, wherein the visualization corresponding to the at least one simulation result generated as a result of user selection of one of the indicators is provided within a sidebar within the user interface.

26. The data processing system of claim 10, where said user interface is further configured to enable the user to take a real-time snapshot of a status of the grid for use as a starting point for a contingency analysis simulation.

27. The data processing system of claim 10,
wherein the user interface of the user device is configured to provide a parameter editing sidebar adjacent to the visualization of the power transmission or distribution of the geographical area on the map;
wherein at least one value of a parameter of the simulation is changed by moving at least one slider of the sidebar, wherein changing the at least one parameter changes at least one of: a power-related value of the simulation or a component of the power transmission grid or power distribution grid;
wherein a sidebar color coding is used to indicate out-of-tolerance and in-tolerance conditions; and
wherein the parameter editing sidebar is provided in response to either user selection of one of the indicators of the multi-dimensional representation, or user actuation of a generator or load within the visualization of power transmission or distribution of the geographical area on the map.

28. The data processing system of claim 10, wherein the user interface is further configured to zoom-in or zoom-out of the visualization of the power transmission or distribution of the geographical area on the map.

29. The data processing system of claim 10, wherein the simulation is a multistep simulation in which the at least one simulation result is compared to one or more allowable bounds.

30. The data processing system of claim 10, wherein the user interface provides connectivity to at least one actuator installed within the power transmission grid or power distribution grid to enable the user to control one or more operational parameters of the power transmission grid or power distribution grid.

31. A system comprising:
a computing platform comprising a first interface to receive inputs from sensors that comprise a part of a grid structure comprised of at least one of a power transmission grid or a power distribution grid, the computing platform configured to execute an electrical power grid simulator program and further comprising a second interface configured to communicate with at least one user device through a communication layer;
the at least one user device connected with the computing platform through the communication layer, the user device comprising a graphical user interface, at least one data processor, and at least one non-transitory computer readable medium that stores program instructions, where execution of the stored program instructions causes the user device to specify, in response to input from the graphical user interface, at least one initial condition and a type of simulation to be performed by the electrical power grid simulator program based on the at least one initial condition, where specifying the type of simulation with said user interface comprises selecting a region of a geographical area visualization of the grid structure comprising at least one of individual nodes or branches of the grid structure on a map such that the simulation corresponds to the selected region, by specifying a physical boundary of the region comprising the at least one of individual nodes or branches of the geographical area visualization on the user interface while a size of the geographical area as perceived to a user stays constant;

to transmit the specified type of simulation and the at least one initial condition from the user device to the computing platform;

to receive from the computing platform a result of the simulation at the user device, the simulation being based on at least one of a steady state model of the grid structure or a dynamical model of the grid structure;

to visualize the result of the simulation with the user interface, where a visualization of the result comprises a result of at least one scenario of the simulation;

wherein visualizing the result of the simulation comprises displaying a multi-dimensional representation comprised of indicators arranged together as a graphical simulation navigator overlaid on the graphical user interface while the graphical user interface provides a visualization of power transmission or distribution of the geographical area on the map, where each indicator corresponds to at least one simulation result, where a user selection of one of the indicators generates a visualization of the corresponding at least one simulation result within the graphical user interface, and where the graphical simulation navigator being overlaid on the graphical user interface renders a portion of the visualization of power transmission or distribution of the geographical area on the map not visible; and to control operation of the grid structure using the at least one user device.

32. The system of claim 31, wherein the visualization corresponding to the at least one simulation result generated as a result of user selection of one of the indicators is provided within a sidebar within the graphical user interface.

33. The system of claim 31, wherein the system is further configured such that in response to a pointing device being slid across a number of the indicators of the graphical simulation navigator to select the number of the indicators, the system initiates an animated slide-show of simulations to be viewed at least with corresponding respective portions of the geographical area of the map corresponding to the selected number of indicators.

34. The system of claim 31, wherein the visualization corresponding to the at least one simulation result generated as a result of user selection of one of the indicators is provided as a graphical plot having a horizontal axis and a vertical axis to provide a visualization of risk.

* * * * *